(12) United States Patent
Asano et al.

(10) Patent No.: US 11,591,236 B2
(45) Date of Patent: Feb. 28, 2023

(54) SOLID ELECTROLYTE MATERIAL AND BATTERY

(71) Applicant: Panasonic Intellectual Property Management Co., Ltd., Osaka (JP)

(72) Inventors: Tetsuya Asano, Nara (JP); Akihiro Sakai, Nara (JP); Masashi Sakaida, Hyogo (JP); Yusuke Nishio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 231 days.

(21) Appl. No.: 16/915,448

(22) Filed: Jun. 29, 2020

(65) Prior Publication Data

US 2020/0328469 A1 Oct. 15, 2020

Related U.S. Application Data

(63) Continuation of application No. PCT/JP2018/046263, filed on Dec. 17, 2018.

(30) Foreign Application Priority Data

Jan. 5, 2018 (JP) .............................. JP2018-000434

(51) Int. Cl.
*C01F 17/36* (2020.01)
*H01M 10/0525* (2010.01)
*H01M 10/0562* (2010.01)

(52) U.S. Cl.
CPC ......... *C01F 17/36* (2020.01); *H01M 10/0525* (2013.01); *H01M 10/0562* (2013.01);
(Continued)

(58) Field of Classification Search
None
See application file for complete search history.

(56) References Cited

U.S. PATENT DOCUMENTS 4,352,869 A 10/1982 Mellors
5,506,073 A 4/1996 Angell et al.
(Continued)

FOREIGN PATENT DOCUMENTS

CN 105254184 A 1/2016
CN 105680048 A 6/2016
(Continued)

OTHER PUBLICATIONS

English Translation of Chinese Search Report dated Jul. 6, 2021 for the related Chinese Patent Application No.201880071236.0.
(Continued)

*Primary Examiner* — Carmen V Lyles-Irving
(74) *Attorney, Agent, or Firm* — McDermott Will & Emery LLP

(57) ABSTRACT

A solid electrolyte material contains Li, M, and X. M contains Y, and X is at least one selected from the group consisting of Cl, Br, and I. A first converted pattern, which is obtained by converting the X-ray diffraction pattern of the solid electrolyte material to change its horizontal axis from the diffraction angle to q, includes its base peak within the range in which q is 2.109 Å$^{-1}$ or more and 2.315 Å$^{-1}$ or less. A second converted pattern, which is obtained by converting the X-ray diffraction pattern to change its horizontal axis from the diffraction angle to $q/q_0$, where $q_0$ is the q corresponding to the base peak in the first converted pattern, includes a peak within each of the range in which $q/q_0$ is 1.28 or more and 1.30 or less and the range in which $q/q_0$ is 1.51 or more and 1.54 or less.

15 Claims, 11 Drawing Sheets

(52) U.S. Cl.
CPC ...... *C01P 2002/72* (2013.01); *C01P 2002/74* (2013.01); *C01P 2002/77* (2013.01); *C01P 2006/40* (2013.01); *H01M 2300/008* (2013.01)

(56) References Cited

U.S. PATENT DOCUMENTS

| | | |
|---|---|---|
| 5,714,279 A | 2/1998 | Zajac, Jr. et al. |
| 9,160,034 B2 | 10/2015 | Kato et al. |
| 10,008,735 B2 | 6/2018 | Ohtomo et al. |
| 2004/0151986 A1 | 8/2004 | Park et al. |
| 2011/0045355 A1 | 2/2011 | Ichikawa |
| 2012/0301796 A1 | 11/2012 | Ohtomo et al. |
| 2012/0308900 A1 | 12/2012 | Ogasa |
| 2013/0295464 A1 | 11/2013 | Yanagi et al. |
| 2015/0147659 A1 | 5/2015 | Kato |
| 2016/0103232 A1 | 4/2016 | Ouspenski et al. |
| 2016/0149259 A1 | 5/2016 | Osada et al. |
| 2016/0156064 A1 | 6/2016 | Miyashita et al. |
| 2016/0204467 A1 | 7/2016 | Nogami et al. |
| 2016/0248119 A1 | 8/2016 | Kato |
| 2016/0268630 A1 | 9/2016 | Tsukada et al. |
| 2016/0285078 A1 | 9/2016 | Deschamps et al. |
| 2016/0308210 A1 | 10/2016 | Sakuda et al. |
| 2016/0359193 A1 | 12/2016 | Yi et al. |
| 2017/0040637 A1 | 2/2017 | Ceder et al. |
| 2017/0179481 A1 | 6/2017 | Yamada et al. |
| 2017/0187066 A1 | 6/2017 | Tsujimura et al. |
| 2017/0222257 A1 | 8/2017 | Miyashita et al. |
| 2017/0229734 A1 | 8/2017 | Furukawa et al. |
| 2017/0288281 A1* | 10/2017 | Chiang ............... H01M 50/451 |
| 2018/0183065 A1 | 6/2018 | Sasaki |
| 2018/0269521 A1 | 9/2018 | Ohtomo et al. |
| 2019/0067736 A1 | 2/2019 | Yoshioka et al. |
| 2019/0088995 A1 | 3/2019 | Asano et al. |
| 2019/0097266 A1 | 3/2019 | Yamamoto et al. |
| 2020/0212481 A1 | 7/2020 | Nagamine et al. |
| 2020/0328454 A1 | 10/2020 | Sakai et al. |
| 2020/0328455 A1 | 10/2020 | Sakai et al. |
| 2020/0328457 A1 | 10/2020 | Sakai et al. |
| 2020/0328460 A1 | 10/2020 | Asano et al. |
| 2020/0328461 A1 | 10/2020 | Asano et al. |
| 2020/0328462 A1 | 10/2020 | Asano et al. |
| 2020/0328464 A1 | 10/2020 | Asano et al. |
| 2020/0328465 A1 | 10/2020 | Sakaida et al. |
| 2020/0328468 A1 | 10/2020 | Sakaida et al. |
| 2020/0335817 A1 | 10/2020 | Asano et al. |
| 2020/0350615 A1 | 11/2020 | Sakaida et al. |
| 2020/0350622 A1 | 11/2020 | Sakaida et al. |

FOREIGN PATENT DOCUMENTS

| | | |
|---|---|---|
| CN | 108701860 A | 10/2018 |
| EP | 2916381 B1 | 6/2016 |
| EP | 3428929 A1 | 1/2019 |
| EP | 3496202 A1 | 6/2019 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| IN | 201847045950 A | 2/2019 |
| JP | S57-132677 A | 8/1982 |
| JP | H05-306117 A | 11/1993 |
| JP | H08-171938 A | 7/1996 |
| JP | H09-293516 A | 11/1997 |
| JP | 11-238528 A | 8/1999 |
| JP | 2001-052733 A | 2/2001 |
| JP | 2004-235155 A | 8/2004 |
| JP | 2006-244734 A | 9/2006 |
| JP | 2008-021556 A | 1/2008 |
| JP | 2011-129312 | 6/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-117753 A | 6/2017 |
| JP | 2017-518622 A | 7/2017 |
| JP | 2017-152324 A | 8/2017 |
| JP | 6222134 B2 | 11/2017 |
| JP | 2017-224474 A | 12/2017 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2017/108105 A1 | 6/2017 |
| WO | 2017/154766 A1 | 9/2017 |
| WO | 2017/154922 A1 | 9/2017 |
| WO | 2018/025582 A1 | 2/2018 |
| WO | 2019/146218 A1 | 8/2019 |
| WO | 2019/146219 A1 | 8/2019 |

OTHER PUBLICATIONS

English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
International Search Report of PCT application No. PCT/JP2018/046263 dated Mar. 19, 2019.
Andreas Bohnsack et al., "The bromides Li3MBr6 (M=Sm-Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb-Lu, Y, Sc): Synthesis, Crystal Structures, and Ionic Motion", Journal of Inorganic and General Chemistry, Jul. 1997, vol. 623/Issue 7, pp. 1067-1073.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046264 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.

(56) References Cited

OTHER PUBLICATIONS

The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patnent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
Indian Examination Report dated Jun. 21, 2022 for the related Indian Patent Application No. 202047027487.
Indian Examination Report dated Mar. 28, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, $Li_3InBr_{6-x}Cl_x$.," Solid State Ionics 179.21-26 (2008): 867-870 (Year: 2008).
Steiner, H-J., and H. D. Lutz, "Neue schnelle Ionenleiter vom Typ $MI_3$ $MIIICl_6$ (MI=Li, Na, Ag; MIII=In, Y)." Zeitschrift fur anorganhische und allgemeine Chemie 613.7 (1992): 26-30 (Year: 1992).
Tomita, Yasumasa et al. "Substitution effect in the ion conductor $Li_3InBr_6$, studied by nuclear magnetic resonance." Zeitschrift fur Naturforschung A 57.6-7 (2002): 447-450 (Year: 2002).
Tomita, Yasumasa et al. "Synthesis of $Li_{3+x}In_{1-x}M_xBr_6$ (M=Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).

* cited by examiner

SOLID ELECTROLYTE MATERIAL AND BATTERY

BACKGROUND

1. Technical Field

The present disclosure relates to solid electrolyte materials and batteries.

2. Description of the Related Art

Japanese Unexamined Patent Application Publication No. 2011-129312 discloses an all-solid-state battery made with a sulfide solid electrolyte.

Z. Anorg. Allg. Chem. 623 (1997), 1067-1073 discloses $Li_3YCl_6$.

Z. Anorg. Allg. Chem. 623 (1997), 1352-1356 discloses $Li_3YBr_6$.

SUMMARY

In one general aspect, the techniques disclosed here feature a solid electrolyte material. The solid electrolyte material contains Li, M, and X. M contains Y, and X is at least one selected from the group consisting of Cl, Br, and I. A first converted pattern, which is obtained by converting the X-ray diffraction pattern of the solid electrolyte material to change its horizontal axis from the diffraction angle 2θ to q, where $q=4\pi \sin\theta/\lambda$, where λ is the wavelength of X-rays, includes a base peak within the range in which q is 2.109 $Å^{-1}$ or more and 2.315 $Å^{-1}$ or less. A second converted pattern, which is obtained by converting the X-ray diffraction pattern to change its horizontal axis from the diffraction angle 2θ to $q/q_0$, where $q_0$ is a value of q corresponding to the base peak in the first converted pattern, includes a peak within each of the range in which $q/q_0$ is 1.28 or more and 1.30 or less and the range in which $q/q_0$ is 1.51 or more and 1.54 or less. The solid electrolyte material satisfies at least one selected from the group consisting of the following: $I_2/I_4 \leq 20\%$ and $I_3/I_4 \leq 30\%$ %, where $I_2$ is the intensity of a second peak, which is the strongest peak within a second range of the second converted pattern, in the second range $q/q_0$ being 0.511 or more and 0.531 or less, $I_3$ is the intensity of a third peak, which is the strongest peak within a third range of the second converted pattern, in the third range $q/q_0$ being 0.565 or more and 0.585 or less, and $I_4$ is the intensity of the peak in the second converted pattern at the point at which $q/q_0$ is 1.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
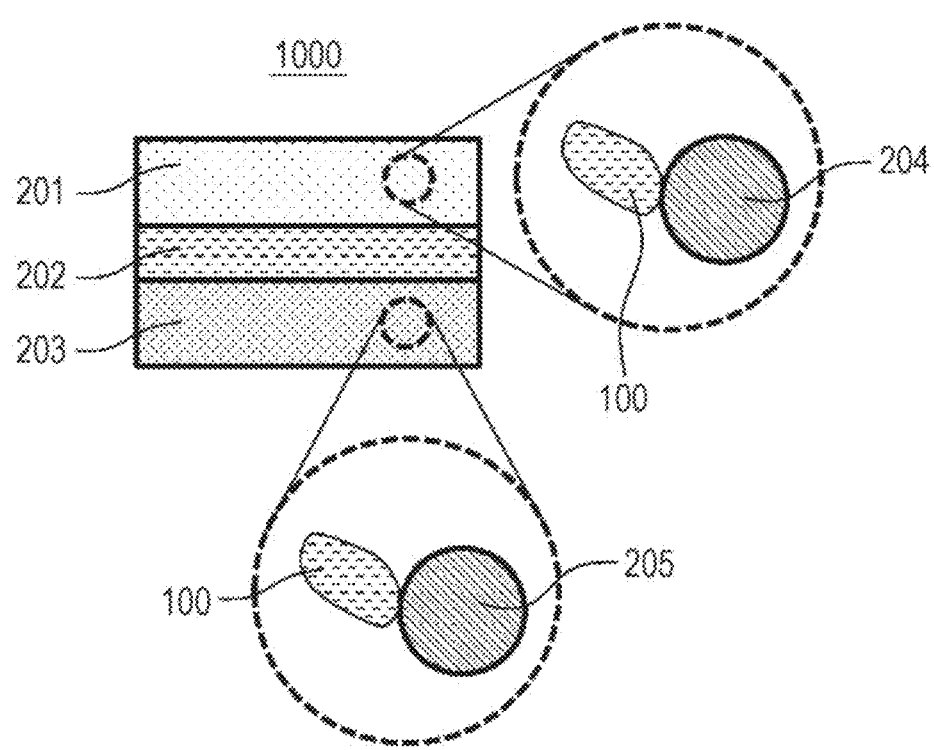
FIG. 1 is a cross-sectional diagram that illustrates a schematic structure of a battery in Embodiment 4.

In the following, embodiments of the present disclosure are described with reference to drawings.

Embodiment 1

A solid electrolyte material in Embodiment 1 is a material composed of Li, M, and X.

M contains Y.

X is at least one selected from the group consisting of Cl, Br, and I.

A first converted pattern, which is obtained by converting the X-ray diffraction pattern of the solid electrolyte material in Embodiment 1 to change its horizontal axis from the diffraction angle 2θ to q, where $q=4\pi \sin\theta/\lambda$, where λ is the wavelength of X-rays, includes a base peak within the range in which q is 2.109 $Å^{-1}$ or more and 2.315 $Å^{-1}$ or less. A second converted pattern, which is obtained by converting the X-ray diffraction pattern to change its horizontal axis from the diffraction angle 2θ to $q/q_0$, where $q_0$ is the q corresponding to the base peak in the first converted pattern, includes a peak within each of the range in which $q/q_0$ is 1.28 or more and 1.30 or less and the range in which $q/q_0$ is 1.51 or more and 1.54 or less.

The solid electrolyte material in Embodiment 1 satisfies at least one selected from the group consisting of the following: $I_2/I_4 \leq 20\%$ and $I_3/I_3 \leq 30\%$ %.

$I_2$ is the intensity of a second peak, which is the strongest peak the second converted pattern has within a second range, in which $q/q_0$ is 0.511 or more and 0.531 or less.

$I_3$ is the intensity of a third peak, which is the strongest peak the second converted pattern has within a third range, in which $q/q_0$ is 0.565 or more and 0.585 or less.

$I_4$ is the intensity of the peak the second converted pattern has at the point at which $q/q_0$ is 1.

This configuration helps realize a halide solid electrolyte material, which is a solid electrolyte material highly conductive to lithium ions.

This configuration, furthermore, helps realize an all-solid-state secondary battery superior in charge and discharge characteristics through the use of the solid electrolyte material in Embodiment 1.

Through the use of the solid electrolyte material in Embodiment 1, moreover, a sulfur-free all-solid-state secondary battery is realized. That is, the configuration of the solid electrolyte material in Embodiment 1 is not one that produces hydrogen sulfide when exposed to the air (e.g., the configuration in Japanese Unexamined Patent Application Publication No. 2011-129312). The use of the material therefore helps realize an all-solid-state secondary battery that produces no hydrogen sulfide and therefore is superior in safety.

In addition, the above configuration helps realize a solid electrolyte material that can be produced by heating at medium or low temperatures and by a short period of heating.

The solid electrolyte material in Embodiment 1 may include a crystal phase. That is, the solid electrolyte material in Embodiment 1 may include a first crystal phase.

When a first crystal phase is subjected to X-ray diffractometry by the θ-2θ method using Cu-Kα radiation (wavelengths, 1.5405 Å and 1.5444 Å) as X-rays, the diffraction pattern exhibits a relatively strong peak within each of the ranges in which the diffraction angle 2θ is 15° or more and 18° or less, 30° or more and 33° or less, 39° or more and 43° or less, and 47° or more and 51° or less if the intensity is sufficiently high. If the measured intensity is insufficient, the pattern may lack a subset of the peaks.

When a first crystal phase is analyzed to create a diffraction diagram by changing 2θ, which is commonly used as the horizontal axis in X-ray diffraction diagrams, to the scattering vector, defined as $q=4\pi \sin(\theta)/\lambda$, and taking normalized $q/q_0$, where $q_0$ is a peak present in the range in which $q=2.109$ Å$^{-1}$ or more and 2.315 Å$^{-1}$ or less, as the horizontal axis, the diffraction diagram exhibits a peak within each of the ranges in which $q/q_0$ is 0.50 or more and 0.515 or less, 1.28 or more and 1.30 or less, and 1.51 or more and 1.54 or less, and such a $q_0$ exists. If the measured intensity is insufficient, the diagram may lack a subset of the peaks. In the range in which $q/q_0=0.550$ to 0.565, the diagram has no clear peak. If any peak is observed in this range, the crystal phase can be a second crystal phase as described below in Embodiment 2.

The range in which $q/q_0=0.503$ to 0.514, where $q_0$ is as defined above, is named a first peak range, the range in which $q/q_0=0.511$ to 0.531 a second peak range, the range in which $q/q_0=0.565$ to 0.585 a third peak range, and the peak at which $q=q_0$ a fourth peak. The diffraction angle at which the strongest peak within the n-th peak range has its apex, the half-width of that peak, and the intensity of that peak are defined as $2\theta_n$, $\Delta 2\theta_n$, and $I_n$, respectively. In this setting, one or both of the following relationships hold true for a first crystal phase: $I_2/I_4 \leq 20\%$ and $I_3/I_3 \leq 30\%$ %. If there is no peak in the range, $I_n=0$.

The solid electrolyte material in Embodiment 1 may satisfy at least one selected from the group consisting of the following: $\Delta\theta_1/\theta_{p1}>0.5\%$, $\Delta\theta_2/\theta_{p2}>0.5\%$, and $\Delta\theta_3/\theta_{p3}>0.5\%$.

$2\theta_{p1}$ is the diffraction angle at which a first peak, which is the strongest peak the second converted pattern has within a first range, in which $q/q_0$ is 0.503 or more and 0.514 or less, has its apex.

$\Delta 2\theta_1$ is the half-width of the first peak.

$2\theta_{p2}$ is the diffraction angle at which the second peak has its apex.

$\Delta 2\theta_2$ is the half-width of the second peak.

$2\theta_{p3}$ is the diffraction angle at which the third peak has its apex.

$\Delta 2\theta_3$ is the half-width of the third peak.

This configuration helps realize a solid electrolyte material more conductive to lithium ions. A solid electrolyte material that can be produced by heating at medium or low temperatures and by a short period of heating is also realized.

In Embodiment 1, furthermore, it may be that at least any one of the following relationships holds true: $\Delta\theta_1/\theta_{p1}>1\%$, $\Delta\theta_2/\theta_{p2}>1\%$, and $\Delta\theta_3/\theta_{p3}>1\%$. In particular, ensuring $\Delta\theta_2/\theta_{p2}>2\%$ and $\Delta\theta_3/\theta_{p3}>2\%$ makes the above advantages more prominent.

To determine the intensity $I_n$ of the peaks, the diffraction angle $2\theta_n$ at which the peaks are, and the half-width $\Delta 2\theta_n$ of the peaks, one may directly measure the characteristics of the peaks by subtracting the background from each peak, or may fit the peaks to a Gaussian function and use the fitting parameters to determine the characteristics.

In the solid electrolyte material in Embodiment 1, X may contain Cl.

This configuration helps realize a solid electrolyte material more conductive to lithium ions. A solid electrolyte material that can be produced by heating at medium or low temperatures and by a short period of heating is also realized.

A first crystal phase, which gives a characteristic diffraction diagram as described above, is not limited to a particular crystal structure, but an example is the $Li_3YbCl_6$ (hereinafter also denoted as LYC) system, which has a crystal structure that belongs to the space group Pnma. Its detailed atomic arrangement is found in the Inorganic Crystal Structure Database (ICSD) (ICSD No. 50152).

Such a crystal structure, moreover, has two or more sites occupied by Y or a cation other than Li, and their occupancy appears to be approximately from 0.1 to 0.9.

Figure 2A:
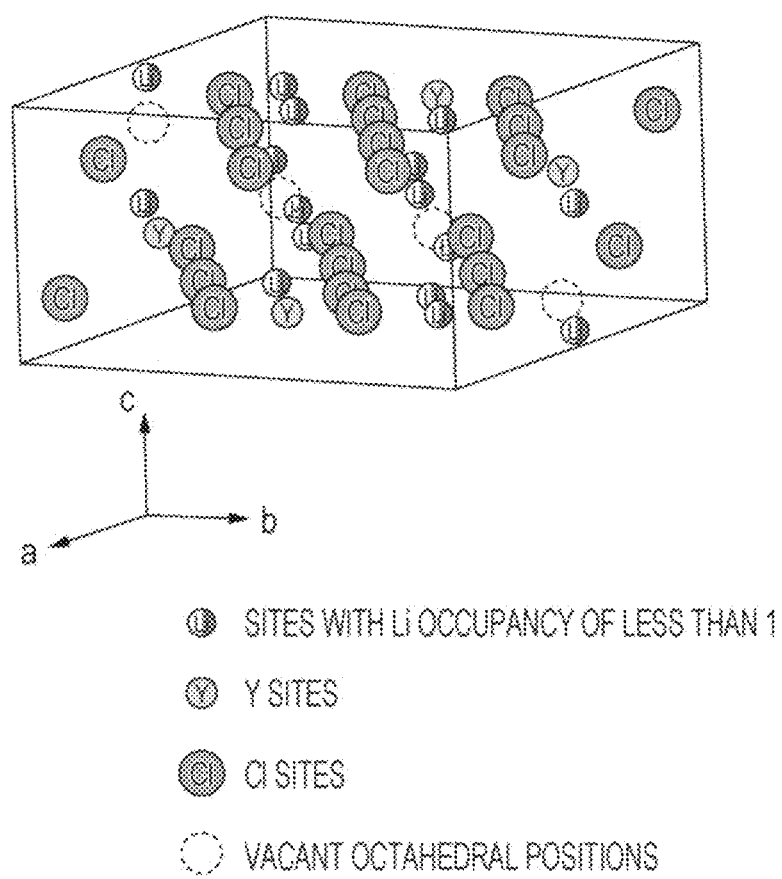
FIG. 2A is a diagram illustrating the crystal structure of a $Li_3YbCl_6$ system in which Yb has been replaced with Y.
Figure 2B:
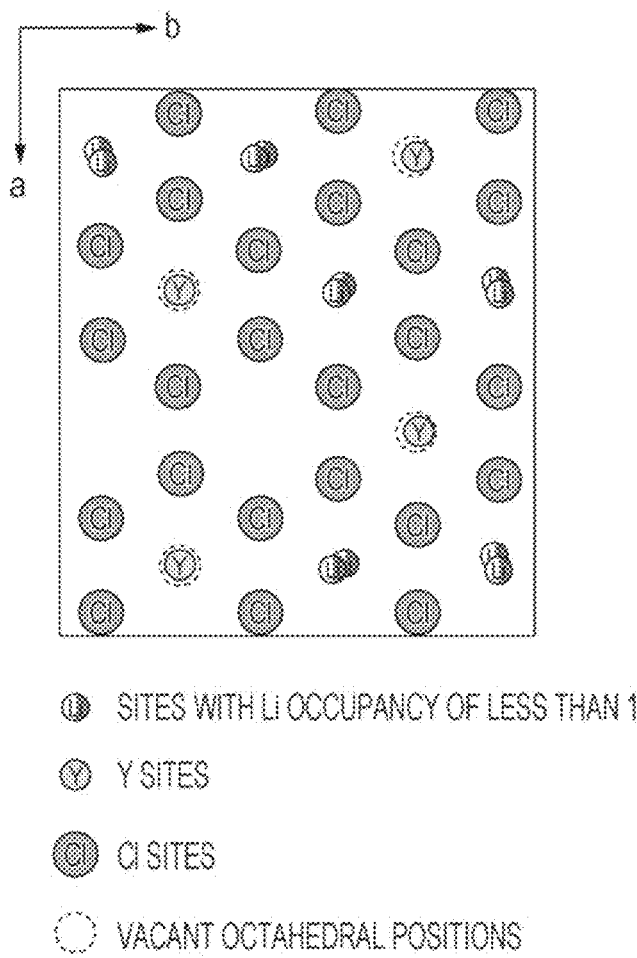
FIG. 2B is a diagram illustrating the crystal structure of a $Li_3YbCl_6$ system in which Yb has been replaced with Y.

FIGS. 2A and 2B are schematic views of a structure of $Li_3YbCl_6$ in which Yb has been replaced with Y.

In a first crystal phase, the inventors believe, Y occupies not only the Y position in FIGS. 2A and 2B but also some of the cation-unoccupied octahedral positions, the $Li_1$ position, and the $Li_2$ position. This becomes evident through the analysis and simulation of XRD patterns.

Figure 2C:
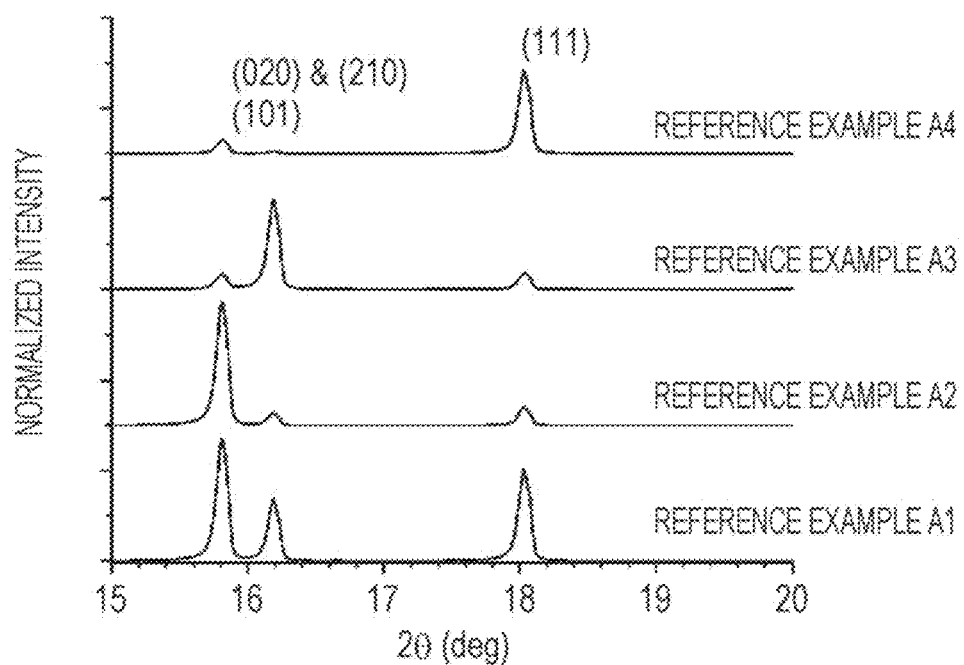
FIG. 2C is a diagram illustrating XRD patterns of $Li_3YbCl_6$ systems in which Yb has been replaced with Y.

FIG. 2C presents simulation results for the XRD pattern of the $Li_3YCl_6$ illustrated in FIGS. 2A and 2B (Reference Example A1), an XRD pattern when 30% of Y occupies a cation-unoccupied octahedral position (Reference Example A2), an XRD pattern when 30% of Y occupies the $Li_1$ site (Reference Example A3), and an XRD pattern when 30% of Y occupies the $Li_2$ site (Reference Example A4).

In Reference Example A2, for example, the intensity of the XRD peaks in the second and third peak ranges is low in comparison with that in Reference Example A1. This is an XRD pattern of a first crystal phase.

These simulations were performed using RIETAN-FP (see F. Izumi and K. Momma, "Three-dimensional visualization in powder diffraction," Solid State Phenom., 130, 15-20 (2007).).

If a first crystal phase is in the LYC system, the main peak in the first peak range stems from diffraction at the (020) and (210) planes, the main peak in the second peak range stems from diffraction at the (101) plane, and the main peak in the third peak range stems from diffraction at the (111) plane. The structure factors in the diffraction at these crystal planes are largely contributed to by a term derived from the scattering factor of Y. In the diffraction at these crystal planes, however, scattering by Cl contributes little because waves scattered by Cl atoms weaken one another. The reason for the strong scattering by Y is that the LYC system illustrated in FIGS. 2A and 2B has only one type of equivalent Y sites (denoted as the Y1 site); there are no other Y sites that would interfere with them. If the octahedral sites other than the Y1 site include additional Y site(s), it means waves scattered by Y atoms likewise weaken one another at the aforementioned (020), (210), (101), and (111) planes, losing their intensity. As shown by Reference Examples A2 to A4, what peaks lose their diffraction intensity varies according to the position of the additional Y site(s). The amount of loss, moreover, varies according to the Y occupancy of the additional and initial Y sites.

The solid electrolyte material in Embodiment 1, therefore, may have a crystal structure of the $Li_3YbCl_6$ system, which belongs to the space group Pnma.

In that case, M may occupy multiple equivalent positions in the crystal structure, and the M occupancy of each of the multiple equivalent positions may be 10% or more.

This configuration helps realize a solid electrolyte material more conductive to lithium ions. A solid electrolyte material that can be produced by heating at medium or low temperatures and by a short period of heating is also realized.

In the solid electrolyte material in Embodiment 1, M may contain at least one selected from the group consisting of Mg, Ca, Sr, Ba, Zn, Zr, Nb, Ta, and Sm.

This configuration helps realize a solid electrolyte material more conductive to lithium ions. A solid electrolyte material that can be produced by heating at medium or low temperatures and by a short period of heating is also realized.

Embodiment 2

In the following, Embodiment 2 is described. Any details that have already been described in Embodiment 1 above are omitted where appropriate.

A solid electrolyte material in Embodiment 2 is a material composed of Li, M, and X.

M contains Y.

X is at least one selected from the group consisting of Cl, Br, and I.

A first converted pattern, which is obtained by converting the X-ray diffraction pattern of the solid electrolyte material in Embodiment 2 to change its horizontal axis from the diffraction angle 2θ to q, where $q=4\pi \sin\theta/\lambda$, where λ is the wavelength of X-rays, includes a base peak within the range in which q is 2.109 Å$^{-1}$ or more and 2.315 Å$^{-1}$ or less. A second converted pattern, which is obtained by converting the X-ray diffraction pattern to change its horizontal axis from the diffraction angle 2θ to $q/q_0$, where $q_0$ is the q corresponding to the base peak in the first converted pattern, includes a peak within each of the range in which $q/q_0$ is 1.28 or more and 1.30 or less and the range in which $q/q_0$ is 1.51 or more and 1.54 or less.

The solid electrolyte material in Embodiment 2 satisfies at least one selected from the group consisting of the following: $I_2/I_1 \leq 100\%$ and $I_2/I_3 \leq 30\%$.

$I_1$ is the intensity of a first peak, which is the strongest peak the second converted pattern has within a first range, in which $q/q_0$ is 0.503 or more and 0.514 or less.

$I_2$ is the intensity of a second peak, which is the strongest peak the second converted pattern has within a second range, in which $q/q_0$ is 0.550 or more and 0.565 or less.

$I_4$ is the intensity of the peak the second converted pattern has at the point at which $q/q_0$ is 1.

This configuration helps realize a halide solid electrolyte material, which is a solid electrolyte material highly conductive to lithium ions.

This configuration, furthermore, helps realize an all-solid-state secondary battery superior in charge and discharge characteristics through the use of the solid electrolyte material in Embodiment 2.

Through the use of the solid electrolyte material in Embodiment 2, moreover, a sulfur-free all-solid-state secondary battery is realized. That is, the use of the material helps realize an all-solid-state secondary battery that produces no hydrogen sulfide and therefore is superior in safety.

In addition, the above configuration helps realize a solid electrolyte material that can be produced by heating at medium or low temperatures and by a short period of heating.

The solid electrolyte material in Embodiment 2 may include a crystal phase. That is, the solid electrolyte material in Embodiment 2 may include a second crystal phase.

When a second crystal phase is subjected to X-ray diffractometry by the θ-2θ method using Cu-Kα radiation (wavelengths, 1.5405 Å and 1.5444 Å) as X-rays, the diffraction pattern exhibits a relatively strong peak within each of the ranges in which the diffraction angle 2θ is 15° or more and 18° or less, 30° or more and 33° or less, 39° or more and 43° or less, and 47° or more and 51° or less if the intensity is sufficiently high. If the measured intensity is insufficient, the pattern may lack a subset of the peaks.

When a second crystal phase is analyzed to create a diffraction diagram by changing 2θ, which is commonly used as the horizontal axis in X-ray diffraction diagrams, to the scattering vector, defined as $q=4\pi \sin(\theta)/\lambda$, and taking normalized $q/q_0$, where $q_0$ is a peak present in the range in which $q=2.109$ Å$^{-1}$ to 2.315 Å$^{-1}$, as the horizontal axis, the diffraction diagram exhibits a peak within each of the ranges in which $q/q_0$ is 0.50 or more and 0.515 or less, 1.28 or more and 1.30 or less, and 1.51 or more and 1.54 or less, and such a $q_0$ exists. If the measured intensity is insufficient, the diagram may lack a subset of the peaks. In the ranges in which $q/q_0=0.515$ to 0.525 or $q/q_0=0.57$ to 0.59, the diagram has no clear peak. If any peak is observed in these ranges, the crystal phase can be a first crystal phase.

For a second crystal phase, the range in which $q/q_0=0.503$ to 0.514, where $q_0$ is as defined above, is named a first peak range, the range in which $q/q_0=0.550$ to 0.565 a second peak range, and the peak at which $q=q_0$ a fourth peak. The diffraction angle at which the strongest peak within the n-th peak range has its apex, the half-width of that peak, and the intensity of that peak are defined as $2\theta_n$, $\Delta 2\theta_n$, and $I_n$, respectively. In this setting, one or both of the following relationships hold true for a second crystal phase: $I_2/I_1 \leq 100\%$ and $I_2/I_3 \leq 30\%$. If there is no peak in the range, $I_n=0$.

In the solid electrolyte material in Embodiment 2, X may contain Cl.

This configuration helps realize a solid electrolyte material more conductive to lithium ions. A solid electrolyte material that can be produced by heating at medium or low temperatures and by a short period of heating is also realized.

A second crystal phase, which gives a characteristic diffraction diagram as described above, is not limited to a particular crystal structure, but an example is the $Li_3ErCl_6$ (hereinafter also denoted as LEC) system, which has a crystal structure that belongs to the space group P-3m1. Its detailed atomic arrangement is found in the Inorganic Crystal Structure Database (ICSD) (ICSD No. 50151).

In a second crystal phase, moreover, such a crystal structure has three or more sites occupied by Y or a cation other than Li, and their occupancy appears to be approximately from 0.1 to 0.9.

If a second crystal phase is in the aforementioned LEC system, the main peak in the first peak range stems from diffraction at the (110) plane, and the main peak in the second peak range stems from diffraction at the (101) plane. The structure factors in the diffraction at these crystal planes are largely contributed to by a term derived from the scattering factor of Y. In the diffraction at these crystal planes, however, scattering by Cl contributes little because waves scattered by Cl atoms weaken one another. The reason for the strong scattering by Y is that the LEC system has only two types of equivalent Y sites (denoted as the Y1 site and the Y2 site); there are no other Y sites that would interfere with them. If the octahedral sites other than the Y1 and Y2 sites include additional Y site(s), it means waves scattered by Y atoms likewise weaken one another at the aforementioned (101) and (110) planes, losing their intensity. What peaks lose their diffraction intensity varies according to the position of the additional Y site(s). The amount of loss, moreover, varies according to the Y occupancy of the additional and initial Y sites.

This configuration helps realize a solid electrolyte material more conductive to lithium ions. Specifically, it seems that when the solid electrolyte material has a crystal structure like a second crystal phase, anions are attracted to the vicinity of Y or M more strongly, and at the same time Y is dispersed across different octahedral positions, destabilizing part of the potential in the crystal, thereby making the crystal more conductive to lithium ions. As a result, the inventors believe, the material's lithium ion conductivity is further improved.

The solid electrolyte material in Embodiment 2, therefore, may have a crystal structure of the $Li_3ErCl_6$ system, which belongs to the space group P-3m1.

In that case, M may occupy three or more equivalent positions in the crystal structure, and the M occupancy of each of the three or more equivalent positions may be 10% or more.

This configuration helps realize a solid electrolyte material more conductive to lithium ions. A solid electrolyte material that can be produced by heating at medium or low temperatures and by a short period of heating is also realized.

In the solid electrolyte material in Embodiment 2, M may contain at least one selected from the group consisting of Mg, Ca, Sr, Ba, Zn, Zr, Nb, Ta, and Sm.

This configuration helps realize a solid electrolyte material more conductive to lithium ions. A solid electrolyte material that can be produced by heating at medium or low temperatures and by a short period of heating is also realized.

Embodiment 3

In the following, Embodiment 3 is described. Any details that have already been described in Embodiment 1 or 2 above are omitted where appropriate.

A solid electrolyte material in Embodiment 3 is a material composed of Li, M, and X.

M contains Y.

X is one or two or more elements selected from the group consisting of Cl, Br, and I.

A first converted pattern, which is obtained by converting the X-ray diffraction pattern of the solid electrolyte material in Embodiment 3 to change its horizontal axis from the diffraction angle 2θ to q, includes two peaks within the range in which q is 1.76 Å$^{-1}$ or more and 2.18 Å$^{-1}$ or less. Of the two peaks, the peak at the smaller q is the base peak.

q=4π sin θ/λ, where λ is the wavelength of X-rays.

A second converted pattern, which is obtained by converting the X-ray diffraction pattern to change its horizontal axis from the diffraction angle 2θ to $q/q_0'$, includes a peak within each of the range in which $q/q_0'$ is 1.14 or more and 1.17 or less and the range in which $q/q_0'$ is 1.625 or more and 1.645 or less.

$q_0'$ is the q corresponding to the base peak in the first converted pattern.

The solid electrolyte material in Embodiment 3 satisfies at least one selected from the group consisting of the following: $I_1/I_6 \leq 15\%$, $I_2/I_6 \leq 5\%$, and $I_3/I_6 \leq 5\%$.

$I_1$ is the intensity of a first peak, which is the strongest peak the second converted pattern has within a first range, in which $q/q_0'$ is 0.494 or more and 0.511 or less.

$I_2$ is the intensity of a second peak, which is the strongest peak the second converted pattern has within a second range, in which $q/q_0'$ is 0.538 or more and 0.550 or less.

$I_3$ is the intensity of a third peak, which is the strongest peak the second converted pattern has within a third range, in which $q/q_0'$ is 0.559 or more and 0.575 or less.

$I_4$ is the intensity of a fourth peak, which is the strongest peak the second converted pattern has within a fourth range, in which $q/q_0'$ is 0.632 or more and 0.644 or less.

16 is the intensity of a sixth peak, which is the strongest peak the second converted pattern has within a sixth range, in which $q/q_0'$ is 1.140 or more and 1.170 or less.

This configuration helps realize a halide solid electrolyte material, which is a solid electrolyte material highly conductive to lithium ions.

This configuration, furthermore, helps realize an all-solid-state secondary battery superior in charge and discharge characteristics through the use of the solid electrolyte material in Embodiment 3.

Through the use of the solid electrolyte material in Embodiment 3, moreover, a sulfur-free all-solid-state secondary battery is realized. That is, the use of the material helps realize an all-solid-state secondary battery that produces no hydrogen sulfide and therefore is superior in safety.

In addition, the above configuration helps realize a solid electrolyte material that can be produced by heating at medium or low temperatures and by a short period of heating.

The solid electrolyte material in Embodiment 3 may include a crystal phase. That is, the solid electrolyte material in Embodiment 3 may include a third crystal phase as defined below.

When a third crystal phase is subjected to X-ray diffractometry by the θ-2θ method using Cu-Kα radiation (wavelengths, 1.5405 Å and 1.5444 Å) as X-rays, the diffraction pattern exhibits one or more peaks within the range in which the diffraction angle 2θ is 13° or more and 18° or less, two or more distinctive peaks within the range in which 2θ is 25° or more and 35° or less, one or more peaks within the range in which 2θ is 43° or more and 51° or less, and two or more peaks within the range in which 50° or more and 63° or less if the intensity is sufficiently high. If the measured intensity is insufficient, the pattern may lack a subset of the peaks.

When a third crystal phase is analyzed to create a diffraction diagram by changing 2θ, which is commonly used as the horizontal axis in X-ray diffraction diagrams, to the scattering vector, defined as $q=4\pi \sin(\theta)/\lambda$, and taking normalized $q/q_0'$, where $q_0'$ is the q for the peak on the lower-angle side of the two strong peaks present within the range in which $q=1.76$ Å$^{-1}$ to 2.18 Å$^{-1}$, as the horizontal axis, the diffraction diagram exhibits a peak within each of the ranges in which $q/q_0'$ is 0.49 or more and 0.66 or less, 1.14 or more and 1.17 or less, 1.625 or more and 1.645 or less, 1.88 or more and 1.94 or less, and 1.9 or more and 2.1 or less. If the measured intensity is insufficient, the diagram may lack a subset of the peaks.

The range in which $q/q_0'=0.494$ to 0.511, where $q_0'$ is as defined above, is named a first peak range, the range in which $q/q_0'=0.538$ to 0.550 a second peak range, the range in which $q/q_0'=0.559$ to 0.575 a third peak range, the range in which $q/q_0'=0.632$ to 0.644 a fourth peak range, the peak at which $q=q_0'$ a fifth peak, and the range in which $q/q_0'=1.140$ to 1.170 a sixth peak range. The diffraction angle at which the strongest peak within the n-th peak range has its apex, the half-width of that peak, and the intensity of that peak are defined as $2\theta_n$, 420, and $I_n$, respectively. In this setting, one or both of the following relationships hold true for a third crystal phase: $I_2/I_4 \leq 20\%$ and $I_3/I_3 \leq 30\%$ %. If there is no peak in the range, $I_n=0$.

The solid electrolyte material in Embodiment 3 may satisfy at least one selected from the group consisting of the following: $I_1/I_5 \leq 20$ %, $I_2/I_5 \leq 10\%$, $I_3/I_5 \leq 20\%$, and $I_4/I_5 \leq 10\%$.

$I_5$ is the intensity of the peak the second converted pattern has at the point at which $q/q_0'$ is 1.

This configuration helps realize a solid electrolyte material more conductive to lithium ions. A solid electrolyte material that can be produced by heating at medium or low temperatures and by a short period of heating is also realized.

The solid electrolyte material in Embodiment 3 may satisfy at least one selected from the group consisting of the following: $\Delta\theta_1/\theta_{p1}>1\%$, $\Delta\theta_2/\theta_{p2}>1\%$, $\Delta\theta_3/\theta_{p3}>1\%$, and $\Delta\theta_4/\theta_{p4}>1\%$.

$2\theta_{p1}$ is the diffraction angle at which the first peak has its apex.

$\Delta2\theta_1$ is the half-width of the first peak.

$2\theta_{p2}$ is the diffraction angle at which the second peak has its apex.

$\Delta2\theta_2$ is the half-width of the second peak.

$2\theta_{p3}$ is the diffraction angle at which the third peak has its apex.

$\Delta2\theta_3$ is the half-width of the third peak.

$2\theta_{p4}$ is the diffraction angle at which the fourth peak has its apex.

$\Delta2\theta_4$ is the half-width of the fourth peak.

This configuration helps realize a solid electrolyte material more conductive to lithium ions. A solid electrolyte material that can be produced by heating at medium or low temperatures and by a short period of heating is also realized.

In Embodiment 3, therefore, it may be that at least any one of the following relationships holds true: $\Delta\theta_1/\theta_{p1}>1\%$, $\Delta\theta_2/\theta_{p2}>1\%$, $\Delta\theta_3/\theta_{p3}>1\%$, and $\Delta\theta_4/\theta_{p4}>1\%$. In particular, ensuring $\Delta\theta_2/\theta_{p2}>2\%$ and $\Delta\theta_3/\theta_{p3}>2\%$ makes the above advantages more prominent.

To determine the intensity $I_n$ of the peaks, the diffraction angle $2\theta_n$ at which the peaks are, and the half-width $\Delta2\theta_n$ of the peaks, one may directly measure the characteristics of the peaks by subtracting the background from each peak, or may fit the peaks to a Gaussian function and use the fitting parameters to determine the characteristics.

In the solid electrolyte material in Embodiment 3, X may contain Br.

This configuration helps realize a solid electrolyte material more conductive to lithium ions. A solid electrolyte material that can be produced by heating at medium or low temperatures and by a short period of heating is also realized.

A third crystal phase, which gives a characteristic diffraction diagram as described above, is not limited to a particular crystal structure, but examples include crystal structures like those described below.

One is a structure in which the anion sublattice framework is a cubic close-packed (face-centered cubic) or distorted cubic close-packed (face-centered cubic) atomic arrangement. That is, in an anion sublattice, each anion is coordinated to by twelve other anions. The interior angles of the triangle formed by the closest two of these twelve anions and the central anion are all approximately 60°. More specifically, the interior angles of this triangle fall within the range of approximately 60°±5°.

An example of such a structure is the Li$_3$ErBr$_6$ (hereinafter also denoted as LEB) system, which has a crystal structure that belongs to the space group C2/m. Its detailed atomic arrangement is found in the Inorganic Crystal Structure Database (ICSD) (ICSD No. 50182).

Such a crystal structure, moreover, has two or more sites occupied by Y or a cation other than Li, and their occupancy appears to be approximately from 0.1 to 0.9.

Figure 3A:
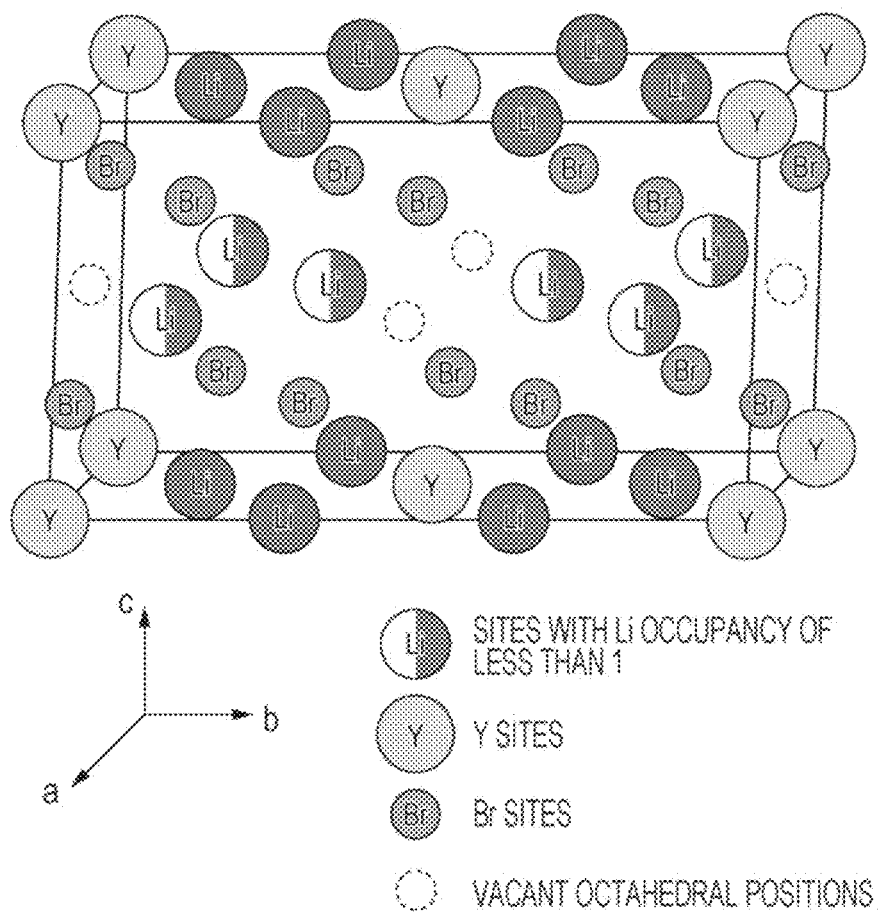
FIG. 3A is a diagram illustrating the crystal structure of a $Li_3ErBr_6$ system in which Er has been replaced with Y.
Figure 3B:
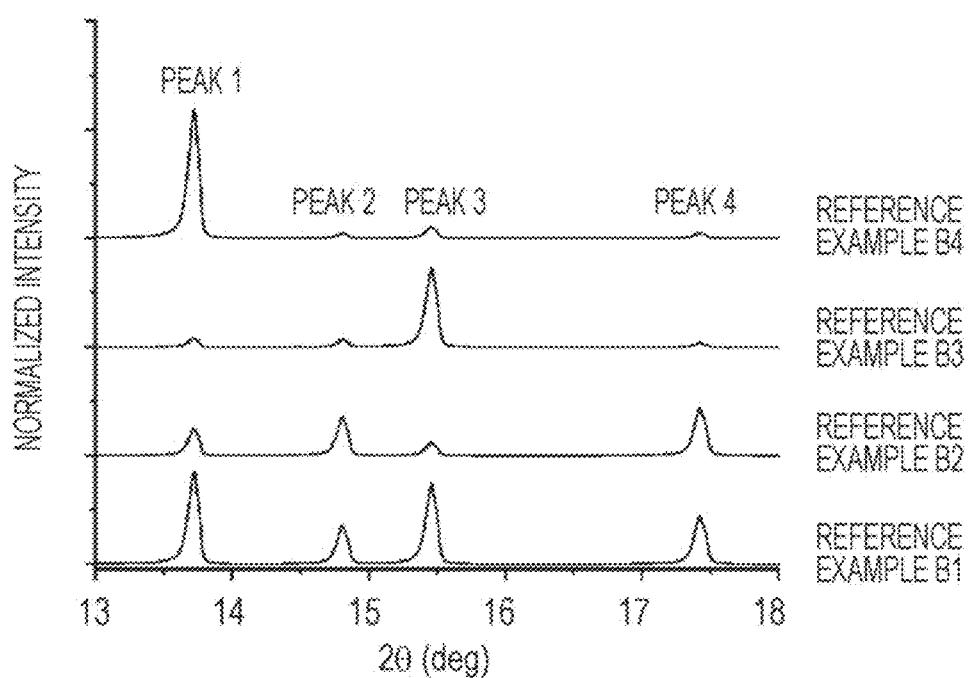
FIG. 3B is a diagram illustrating XRD patterns of $Li_3ErBr_6$ systems in which Er has been replaced with Y.

For example, FIG. 3A is a schematic view of a structure of Li$_3$ErBr$_6$ in which Er has been replaced with Y. In a third crystal phase, the inventors believe, Y occupies not only the Y position in FIG. 3A but also some of the cation-unoccupied octahedral positions, the Li$_1$ position, and the Li$_2$ position. This becomes evident through the analysis and simulation of XRD patterns. FIG. 3B presents simulation results for the XRD pattern of the Li$_3$ErBr$_6$ illustrated in FIG. 3A (Reference Example B1), an XRD pattern when 30% of Y occupies a cation-unoccupied octahedral position (Reference Example B2), an XRD pattern when 30% of Y occupies the Li$_1$ site (Reference Example B3), and an XRD pattern when 30% of Y occupies the Li$_2$ site (Reference Example B4). In Reference Example B2, for example, the intensity of the XRD peaks in the first and third peak ranges is low in comparison with that in Reference Example B1. This is an XRD pattern of a third crystal phase.

If a third crystal phase is in the LEB system, the main peak in the first peak range stems from diffraction at the (001) plane, the main peak in the second peak range stems from diffraction at the (020) plane, the main peak in the third peak range stems from diffraction at the (110) plane, and the main peak in the fourth peak range stems from diffraction at the (11-1) plane. The structure factors in the diffraction from these crystal planes are largely contributed to by a term derived from the scattering factor of Y. In the diffraction at these crystal planes, however, scattering by Br contributes little because waves scattered by Br atoms weaken one another. The reason for the strong scattering by Y is that the LEB system illustrated in FIG. 3A has only one type of equivalent Y sites (denoted as the Y1 site); there are no other Y sites that would interfere with them. If the octahedral sites other than the Y1 site include additional Y site(s), it means waves scattered by Y atoms likewise weaken one another at the aforementioned (001), (020), (110), and (11-1) planes, losing their intensity. As shown by Reference Examples B2 to B4, what peaks lose their diffraction intensity varies according to the position of the additional Y site(s). The amount of loss, moreover, varies according to the Y occupancy of the additional and initial Y sites.

This configuration helps realize a solid electrolyte material more conductive to lithium ions. Specifically, it seems that when the solid electrolyte material has a crystal structure like a third crystal phase, anions are attracted to the vicinity of Y or M more strongly, and at the same time M and Y are mixed together, creating regions in which the potential of Li ions is unstable. This creates a pathway for lithium ions to diffuse through. The Li-depleted composition, moreover, means that unoccupied site(s) is created, making the crystal more conductive to lithium ions. As a result, the inventors believe, the material's lithium ion conductivity is further improved.

The solid electrolyte material in Embodiment 3, therefore, may have a crystal structure of the $Li_3ErBr_6$ system, which belongs to the space group C2/m.

In that case, M may occupy multiple equivalent positions in the crystal structure, and the M occupancy of each of the multiple equivalent positions may be 10% or more.

This configuration helps realize a solid electrolyte material more conductive to lithium ions. A solid electrolyte material that can be produced by heating at medium or low temperatures and by a short period of heating is also realized.

In the solid electrolyte material in Embodiment 3, M may include at least one selected from the group consisting of Mg, Ca, Sr, Ba, Zn, Zr, Nb, Ta, and Sm.

This configuration helps realize a solid electrolyte material more conductive to lithium ions. A solid electrolyte material that can be produced by heating at medium or low temperatures and by a short period of heating is also realized.

The solid electrolyte materials in Embodiments 1 to 3 may include an extra crystal phase, a crystal phase that has a crystal structure that is not a first, second, or third crystal phase.

The solid electrolyte materials in Embodiments 1 to 3, moreover, can be in any shape, such as acicular, spherical, or ellipsoidal. For example, the solid electrolyte materials in Embodiments 1 to 3 may be particles. Multiple particles may be stacked and then compressed to form pellets or sheets.

If the solid electrolyte materials in Embodiments 1 to 3 have a particle shape (e.g., spherical), for example, their median diameter may be 0.1 µm or more and 100 µm or less.

In Embodiments 1 to 3, furthermore, the median diameter may be 0.5 µm or more and 10 µm or less.

This configuration helps further increase ionic conductivity, and also allows the solid electrolyte materials in Embodiments 1 to 3 to form a better dispersion state, for example with an active material.

In Embodiments 1 to 3, furthermore, the solid electrolyte materials may be smaller than the median diameter of an active material.

This configuration allows the solid electrolyte materials in Embodiments 1 to 3 to form a better dispersion state, for example with an active material.

It should be noted that "M occupies n or more equivalent positions in a particular crystal structure" as stated herein specifically includes the meaning that "when the sites occupied by M are subjected to a symmetry operation that satisfies the symmetry of the particular crystal structure, there are n or more types of sites that do not overlap any other." The symmetry of the particular crystal structure can be determined by the space group the crystal structure belongs to.

The notation "the range in which particular parameter A is value B to value C" herein refers to "the range in which B≤A≤C."

Method for Producing a Solid Electrolyte Material

The solid electrolyte materials in Embodiments 1 to 3 can be produced by, for example, the following method.

Raw-material powders of halides are prepared that will result in the proportions of the intended composition. For example, if $Li_3YCl_6$ is produced, LiCl and $YCl_3$ are prepared in a molar ratio of approximately 3:1. The proportions may be adjusted in advance considering any change in composition that will occur during the course of the synthetic process and to cancel that change. After the raw-material powders are mixed together well, the raw-material powders are mixed, milled, and allowed to react by the method of mechanochemical milling. The mixture may then be fired in a vacuum or inert atmosphere.

Alternatively, the raw-material powders may be fired in a vacuum or inert atmosphere after being mixed together well.

The firing conditions can be, for example, a temperature within the range of 100° C. to 550° C. and at least 1 hour of firing. The fired material may then be kept at a predetermined temperature for a duration equal to or shorter than 48 hours and than allowed to cool to room temperature within a time equal to or shorter than 48 hours.

This gives a solid electrolyte material as described above.

The types and crystal structure of crystal phases in the solid electrolyte material and the positions of peaks in the X-ray diffraction pattern using Cu-Kα as the radiation source and in converted patterns can be determined by adjusting the percentages of raw materials and customizing the method and parameters for the reaction between the raw-material powders.

Embodiment 4

In the following, Embodiment 4 is described. Any details that have already been described in any of Embodiments 1 to 3 above are omitted where appropriate.

A battery in Embodiment 4 is made with a solid electrolyte material described in any of Embodiments 1 to 3 above.

The battery in Embodiment 4 includes a solid electrolyte material, a positive electrode, a negative electrode, and an electrolyte layer.

The electrolyte layer is a layer placed between the positive and negative electrodes.

At least one of the positive electrode, electrolyte layer, and negative electrode contains a solid electrolyte material in any of Embodiments 1 to 3.

This configuration helps improve the charge and discharge characteristics of a battery.

In the following, a specific example of a battery in Embodiment 4 is described.

FIG. 1 is a cross-sectional diagram that illustrates a schematic structure of a battery 1000 in Embodiment 4.

The battery 1000 in Embodiment 4 includes a positive electrode 201, a negative electrode 203, and an electrolyte layer 202.

The positive electrode 201 contains positive electrode active material particles 204 and solid electrolyte particles 100.

The electrolyte layer 202 is placed between the positive electrode 201 and the negative electrode 203.

The electrolyte layer 202 contains an electrolyte material (e.g., a solid electrolyte material).

The negative electrode 203 contains negative electrode active material particles 205 and solid electrolyte particles 100.

The solid electrolyte particles 100 are particles of a solid electrolyte material in any of Embodiments 1 to 3 or particles that contain a solid electrolyte material in any of Embodiments 1 to 3 as their primary ingredient.

The positive electrode 201 contains a material that has a tendency to store and release metal ions (e.g., lithium ions). The positive electrode 201 contains, for example, a positive electrode active material (e.g., positive electrode active material particles 204).

The positive electrode active material can be, for example, a lithium-containing transition metal oxide (e.g., Li(NiCoAl)O$_2$ or LiCoO$_2$), a transition metal fluoride, a polyanion or fluorinated polyanion material, a transition metal sulfide, a transition metal oxyfluoride, a transition metal oxysulfide, or a transition metal oxynitride.

The median diameter of the positive electrode active material particles 204 may be 0.1 μm or more and 100 μm or less. If the median diameter of the positive electrode active material particles 204 is smaller than 0.1 μm, the positive electrode active material particles 204 and the halide solid electrolyte material can fail to form a good dispersion state in the positive electrode. This affects the charge and discharge characteristics of the battery. If the median diameter of the positive electrode active material particles 204 is larger than 100 μm, lithium diffusion inside the positive electrode active material particles 204 is slow. High-power operation of the battery can therefore be difficult.

The median diameter of the positive electrode active material particles 204 may be larger than that of the halide solid electrolyte material. This ensures the positive electrode active material particles 204 and the halide solid electrolyte material will form a good dispersion state.

For the ratio by volume between the positive electrode active material particles 204 and the halide solid electrolyte material "v:100−v" in the positive electrode 201, it may be that 30≤v≤95. If v<30, it can be difficult to ensure a sufficiently high energy density of the battery. If v>95, high-power operation can be difficult.

The thickness of the positive electrode 201 may be between 10 and 500 μm. If the thickness of the positive electrode 201 is smaller than 10 μm, it can be difficult to ensure a sufficiently high energy density of the battery. If the thickness of the positive electrode 201 is larger than 500 μm, high-power operation can be difficult.

The electrolyte layer 202 is a layer that contains an electrolyte material. The electrolyte material is, for example, a solid electrolyte material. That is, the electrolyte layer 202 may be a solid electrolyte layer.

A solid electrolyte layer may contain a solid electrolyte material in any of Embodiments 1 to 3 above as its primary ingredient. That is, a solid electrolyte layer may contain a solid electrolyte material in any of Embodiments 1 to 3 above in an amount of, for example, 50% or more as a percentage by weight to the whole solid electrolyte layer (50% by weight or more).

This configuration helps further improve the charge and discharge characteristics of the battery.

A solid electrolyte layer, moreover, may contain a solid electrolyte material in any of Embodiments 1 to 3 above in an amount of, for example, 70% or more as a percentage by weight to the whole solid electrolyte layer (70% by weight or more).

This configuration helps further improve the charge and discharge characteristics of the battery.

It should be noted that a solid electrolyte layer may contain, besides a solid electrolyte material in any of Embodiments 1 to 3 above as its primary ingredient, inevitable impurities or starting materials used for the synthesis of the solid electrolyte material, by-products, decomposition products, etc.

A solid electrolyte layer, furthermore, may contain a solid electrolyte material in any of Embodiments 1 to 3 above in an amount of, for example, 100% as a percentage by weight to the whole solid electrolyte layer (100% by weight) excluding impurities that are inevitably mixed in.

This configuration helps further improve the charge and discharge characteristics of the battery.

A solid electrolyte layer, therefore, may be made solely of a solid electrolyte material in any of Embodiments 1 to 3.

Alternatively, a solid electrolyte layer may be made solely of a solid electrolyte material different from those in Embodiments 1 to 3. The solid electrolyte material different from those in Embodiments 1 to 3 can be, for example, Li$_2$MgX$_4$, Li$_2$FeX$_4$, Li(Al, Ga, In)X$_4$, Li$_3$(Al, Ga, In)X$_6$, LiI, etc. (X: F, Cl, Br, or I).

A solid electrolyte layer may contain a solid electrolyte material in any of Embodiments 1 to 3 and a solid electrolyte material different from those in Embodiments 1 to 3 above together. In that case, the two materials may be dispersed uniformly. It may be that a layer of a solid electrolyte material in any of Embodiments 1 to 3 and a layer of a solid electrolyte material different from those in Embodiments 1 to 3 above are arranged in sequence with respect to the direction of stacking of the battery.

The thickness of a solid electrolyte layer may be 1 μm or more and 1000 μm or less. If the thickness of a solid electrolyte layer is smaller than 1 μm, the risk is high of short-circuiting between the positive electrode 201 and the negative electrode 203. If the thickness of a solid electrolyte layer is larger than 1000 μm, high-power operation can be difficult.

The negative electrode 203 contains a material that has a tendency to store and release metal ions (e.g., lithium ions). The negative electrode 203 contains, for example, a negative electrode active material (e.g., negative electrode active material particles 205).

The negative electrode active material can be, for example, a metallic material, carbon material, oxide, nitride, tin compound, or silicon compound. A metallic material can be a pure metal. Alternatively, a metallic material can be an alloy. Examples of metallic materials include materials such as lithium metal and lithium alloys. Examples of carbon materials include materials such as natural graphite, coke, graphitizing carbon, carbon fiber, spherical carbon, artificial graphite, and amorphous carbon. Silicon (Si), tin (Sn), silicon compounds, and tin compounds are suitable for use in light of capacity per unit volume. The advantage of controlled electrical decomposition provided by the solid electrolyte material in any of Embodiments 1 to 3 is more prominent when the negative electrode active reacts at a low average potential.

The median diameter of the negative electrode active material particles 205 may be 0.1 μm or more and 100 μm or less. If the median diameter of the negative electrode active material particles 205 is smaller than 0.1 μm, the negative electrode active material particles 205 and the solid electrolyte particles 100 can fail to form a good dispersion state in the negative electrode. This affects the charge and discharge characteristics of the battery. If the median diameter of the negative electrode active material particles 205 is larger than 100 μm, lithium diffusion inside the negative electrode active material particles 205 is slow. High-power operation of the battery can therefore be difficult.

The median diameter of the negative electrode active material particles 205 may be larger than that of the solid electrolyte particles 100. This ensures the negative electrode active material particles 205 and the halide solid electrolyte material will form a good dispersion state.

For the ratio by volume between the negative electrode active material particles 205 and the solid electrolyte particles 100 "v:100−v" in the negative electrode 203, it may be that 30≤v≤95. If v<30, it can be difficult to ensure a sufficiently high energy density of the battery. If v>95, high-power operation can be difficult.

The thickness of the negative electrode 203 may be 10 μm or more and 500 μm or less. If the thickness of the negative electrode is smaller than 10 μm, it can be difficult to ensure a sufficiently high energy density of the battery. If the thickness of the negative electrode is larger than 500 μm, high-power operation can be difficult.

At least one of the positive electrode 201, electrolyte layer 202, and negative electrode 203 may contain a sulfide solid electrolyte or oxide solid electrolyte for improved ionic conductivity or chemical stability/electrochemical stability. Sulfide solid electrolytes that can be used include electrolytes such as $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. Oxide solid electrolytes that can be used include electrolytes such as NASICON solid electrolytes, typified by $LiTi_2(PO_4)_3$ and its substituted derivatives, $(LaLi)TiO_3$-based perovskite solid electrolytes, LISICON solid electrolytes, typified by $Li_{14}ZnGe_4O_{16}$, $Li_4SiO_4$, $LiGeO_4$, and their substituted derivatives, garnet-based solid electrolytes, typified by $Li_7La_3Zr_2O_{12}$ and its substituted derivatives, $Li_3N$ and its H-substituted derivatives, and $Li_3PO_4$ and its N-substituted derivatives.

At least one of the positive electrode 201, electrolyte layer 202, and negative electrode 203 may contain an organic polymer solid electrolyte for improved ionic conductivity. An organic polymer solid electrolyte can be, for example, a compound of a polymer and at least one lithium salt. The polymer may have the ethylene oxide structure. By having the ethylene oxide structure, the polymer can accommodate more of the lithium salt, thereby helping further increase ionic conductivity. Lithium salts that can be used include, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt can be one lithium salt selected from these and used alone. Alternatively, the lithium salt can be a mixture of two or more lithium salts selected from these.

At least one of the positive electrode 201, electrolyte layer 202, and negative electrode 203 may contain a nonaqueous liquid electrolyte, gel electrolyte, or ionic liquid for easier exchange of lithium ions and improved output characteristics of the battery.

A nonaqueous liquid electrolyte contains at least one nonaqueous solvent and at least one lithium salt dissolved in the nonaqueous solvent. Nonaqueous solvents that can be used include solvents such as cyclic carbonate solvents, linear carbonate solvents, cyclic ether solvents, linear ether solvents, cyclic ester solvents, linear ester solvents, and fluorinated solvents. Examples of cyclic carbonate solvents include solvents such as ethylene carbonate, propylene carbonate, and butylene carbonate. Examples of linear carbonate solvents include solvents such as dimethyl carbonate, ethyl methyl carbonate, and diethyl carbonate. Examples of cyclic ether solvents include solvents such as tetrahydrofuran, 1,4-dioxane, and 1,3-dioxolane. Linear ether solvents include solvents such as 1,2-dimethoxyethane and 1,2-diethoxyethane. Examples of cyclic ester solvents include solvents such as γ-butyrolactone. Examples of linear ester solvents include solvents such as methyl acetate. Examples of fluorinated solvents include solvents such as fluoroethylene carbonate, methyl fluoropropionate, fluorobenzene, fluoroethyl methyl carbonate, and fluorodimethylene carbonate. The nonaqueous solvent can be one nonaqueous solvent selected from these and used alone. Alternatively, the nonaqueous solvent can be a combination of two or more nonaqueous solvents selected from these. The nonaqueous liquid electrolyte may contain at least one fluorinated solvent selected from the group consisting of fluoroethylene carbonate, methyl fluoropropionate, fluorobenzene, fluoroethyl methyl carbonate, and fluorodimethylene carbonate. Lithium salts that can be used include, for example, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt can be one lithium salt selected from these and used alone. Alternatively, the lithium salt can be a mixture of two or more lithium salts selected from these. The concentration of the lithium salt is in the range of, for example, 0.5 to 2 mol/liter.

A gel electrolyte can be a polymer material soaked with a nonaqueous liquid electrolyte. The polymer material may be, for example, polyethylene oxide, polyacrylonitrile, polyvinylidene fluoride, polymethyl methacrylate, or a polymer having ethylene oxide bonds.

As a component of an ionic liquid, a cation may be, for example, a quaternary salt having aliphatic chains, such as a tetraalkylammonium or tetraalkylphosphonium, an ammonium having an aliphatic ring, such as a pyrrolidinium, morpholinium, imidazolinium, tetrahydropyridinium, piperazinium, or piperidinium, or a nitrogen-containing heterocyclic aromatic cation, such as a pyridinium or imidazolium. As a component of an ionic liquid, an anion may be, for example, $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. An ionic liquid may contain a lithium salt.

At least one of the positive electrode 201, electrolyte layer 202, and negative electrode 203 may contain a binder for improved adhesion between particles. The binder is used to improve the binding together of the materials forming the electrode(s). Examples of binders include materials such as polyvinylidene fluoride, polytetrafluoroethylene, polyethylene, polypropylene, aramid resins, polyamides, polyimides, polyimide-imides, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyethers, polyethersulfones, hexafluoropolypropylene, styrene-butadiene rubber, and carboxymethyl cellulose. A binder, furthermore, can be a copolymer of two or more materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. It may also be that a mixture of two or more materials selected from these is used as a binder.

At least one of the positive electrode 201 and negative electrode 203 may optionally contain a conductive agent.

The conductive agent is used to reduce the electrical resistance of the electrode(s). Examples of conductive agents include materials such as types of graphite, which are natural graphite or artificial graphite, carbon blacks, such as acetylene black and Ketjenblack, conductive fibers, such as carbon fiber and metallic fiber, metallic powders, for example of fluorinated carbon or aluminum, conductive whiskers, for example of zinc oxide or potassium titanate, conductive metal oxides, such as titanium oxide, and conductive polymers, such as polyaniline, polypyrrole, and polythiophene. The use of a carbon conductive agent as a conductive agent is a measure for cost reduction.

Batteries according to Embodiment 4 can be configured as batteries in various shapes, including coin-shaped, cylindrical, square, sheet-shaped, button-shaped, flat-plate, and multilayer.

EXAMPLES

In the following, the details of the present disclosure are described using examples and a comparative example.

Example A1

Production of a Solid Electrolyte Material

Raw-material powders LiCl and $YCl_3$ were weighed out to a molar ratio $LiCl:YCl_3$=3:1 in an argon atmosphere with a dew point of −60° C. or lower. The powders were then milled at 600 rpm for 12 hours using a planetary ball mill.

Testing for Lithium Ion Conductivity

Figure 4:
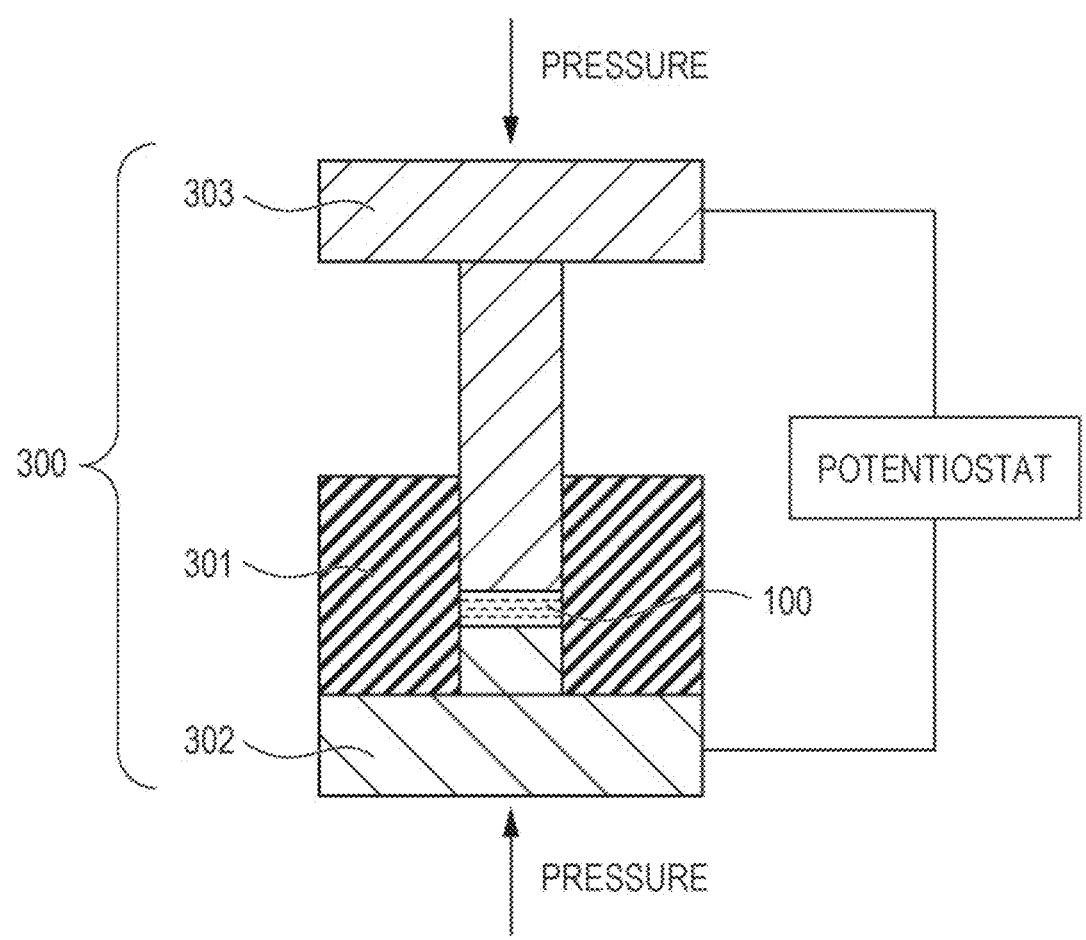
FIG. 4 is a schematic diagram illustrating a method for testing for ionic conductivity.

FIG. 4 is a schematic diagram illustrating a method for testing for lithium ion conductivity.

A compression molding die 300 is composed of an electronically insulating polycarbonate frame 301 and electronically conductive stainless-steel upper punch 303 and lower punch 302.

Using the setup illustrated in FIG. 4, the material was tested for ionic conductivity by the following method.

A powder of the solid electrolyte material in Example A1 was loaded into the compression molding die 300 in a dry atmosphere with a dew point of −30° C. or lower. The loaded powder was uniaxially compressed at 400 MPa, giving a conductivity measurement cell in Example A1.

With the cell being compressed, two lead wires, one from the upper punch 303 and the other from the lower punch 302, were handled to be connected to a potentiostat equipped with a frequency response analyzer (VersaSTAT 4, Princeton Applied Research), and the ionic conductivity at room temperature was measured by electrochemical impedance spectroscopy.

Figure 5:
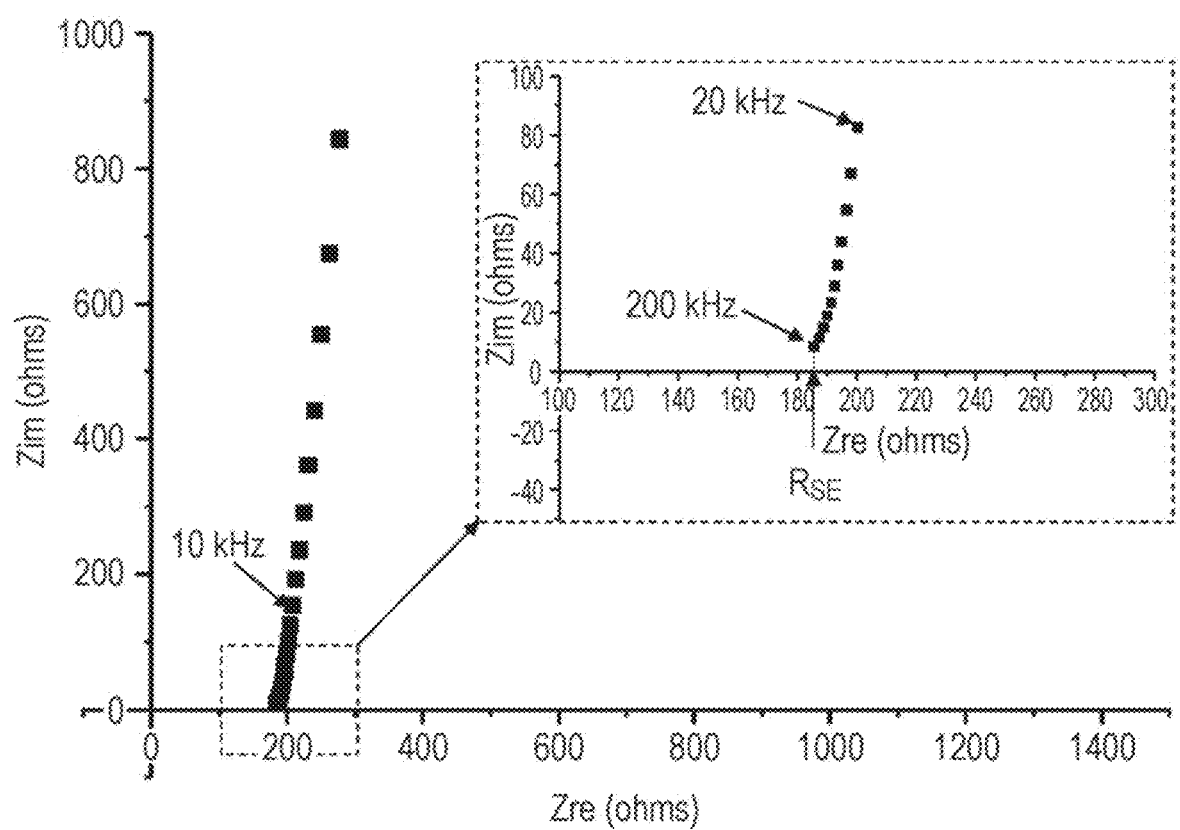
FIG. 5 is a graph illustrating the results of a test for ionic conductivity by AC impedance spectroscopy.

A Cole-Cole diagram for the results of the impedance measurement is presented in FIG. 5.

In FIG. 5, the real impedance at the measuring point at which the absolute phase of the complex impedance is the smallest (arrow in FIG. 5) was deemed to be the resistance of the solid electrolyte in Example A1 to ionic conduction.

Using the resistance of the electrolyte, ionic conductivity was calculated by the equation below.

$$\sigma=(R_{SE} \times S/t)^{-1}$$

where σ is ionic conductivity, S is the area of the electrolyte (the inner diameter of the frame 301 in FIG. 4), $R_{SE}$ is the resistance of the solid electrolyte from the impedance measurement, and t is the thickness of the electrolyte (the thickness of the compact of multiple solid electrolyte particles 100 in FIG. 4).

The ionic conductivity, measured at 22° C., of the solid electrolyte material in Example A1 was 6.0×10$^{-4}$ S/cm.

Analysis of the Crystal Structure

Figure 6A:
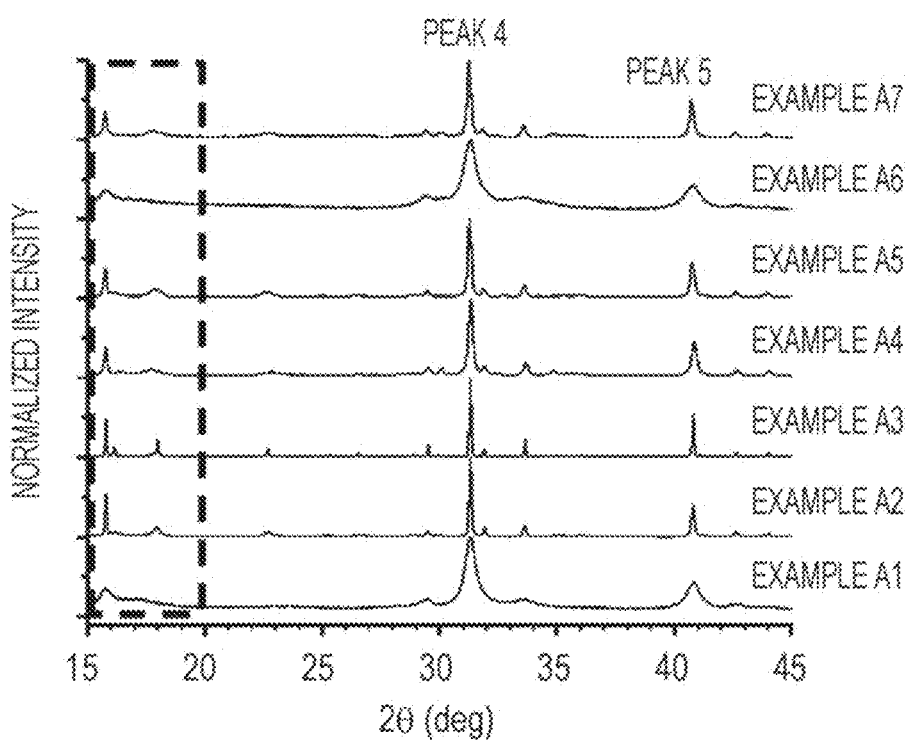
FIG. 6A is a graph illustrating XRD patterns in Examples A1 to A7.

FIG. 6A is a graph illustrating XRD patterns.

Figure 6B:
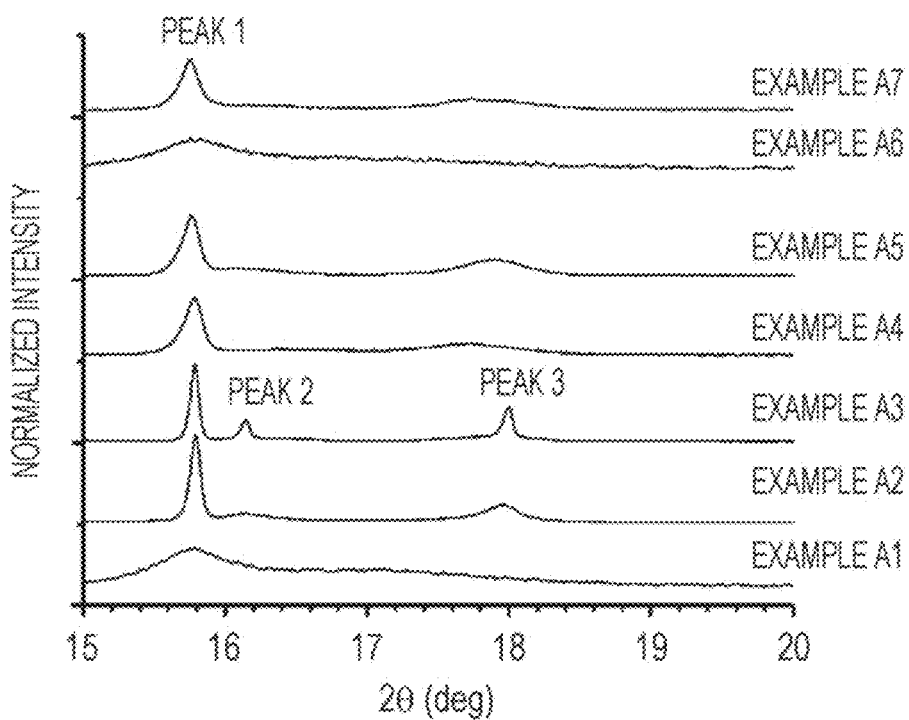
FIG. 6B is a graph illustrating XRD patterns in Examples A1 to A7.

FIG. 6B is a graph illustrating XRD patterns as close-ups of the range in FIG. 6A in which 2θ=15° to 2θ °.

The results presented in FIGS. 6A and 6B were measured by the following method.

That is, the analysis of the crystal structure of the solid electrolyte was done by measuring the X-ray diffraction pattern in a dry environment with a dew point of −45° C. or lower using an X-ray diffractometer (MiniFlex 600, RIGAKU). The X-ray source was Cu-Kα radiation. In other words, X-ray diffraction (XRD) was measured by the θ-2θ method using Cu-Kα radiation (wavelengths, 1.5405 Å and 1.5444 Å) as X-rays.

The X-ray diffraction pattern in Example A1 exhibited relatively strong peaks at 31.34°, 40.86°, and 48.68°.

These peaks were substantially consistent with some peak positions in the X-ray diffraction diagram from an LYC phase.

Figure 6C:
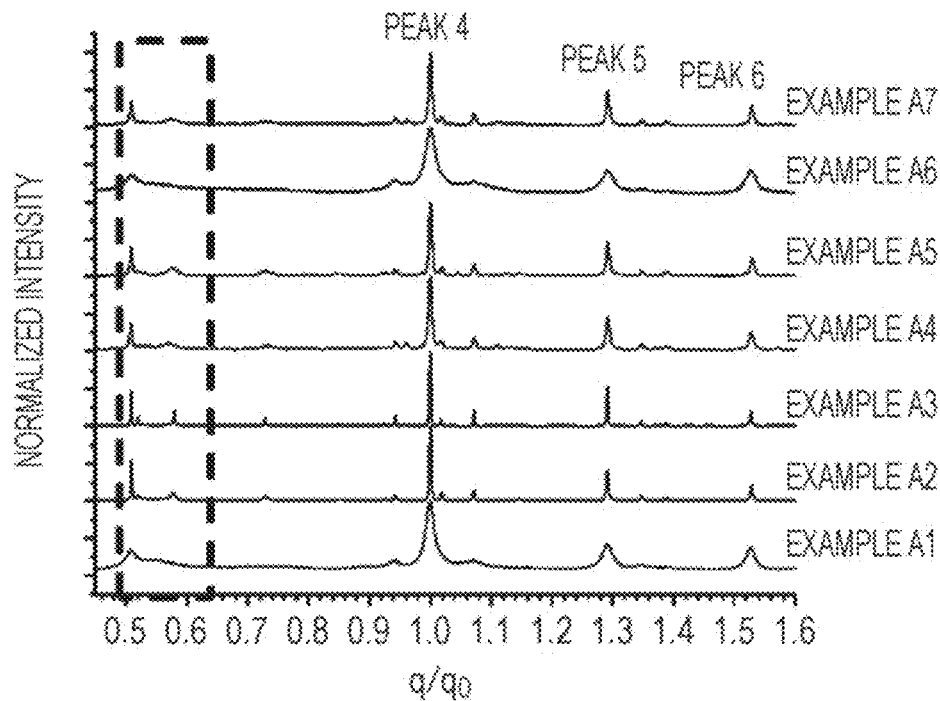
FIG. 6C is a graph illustrating XRD patterns in Examples A1 to A7.

The horizontal axis 2θ of the XRD pattern was changed to q=4π sin(θ)/λ, and q was normalized by $q_0$=2.338 Å$^{-1}$, the q at one of the peak positions, 2θ=31.34°. FIG. 6C is a diffraction diagram obtained when the normalized $q/q_0$ was taken as the horizontal axis. In FIG. 6C, peaks were observed at the points at which $q/q_0$=1.2923 and 1.5259.

Figure 6D:
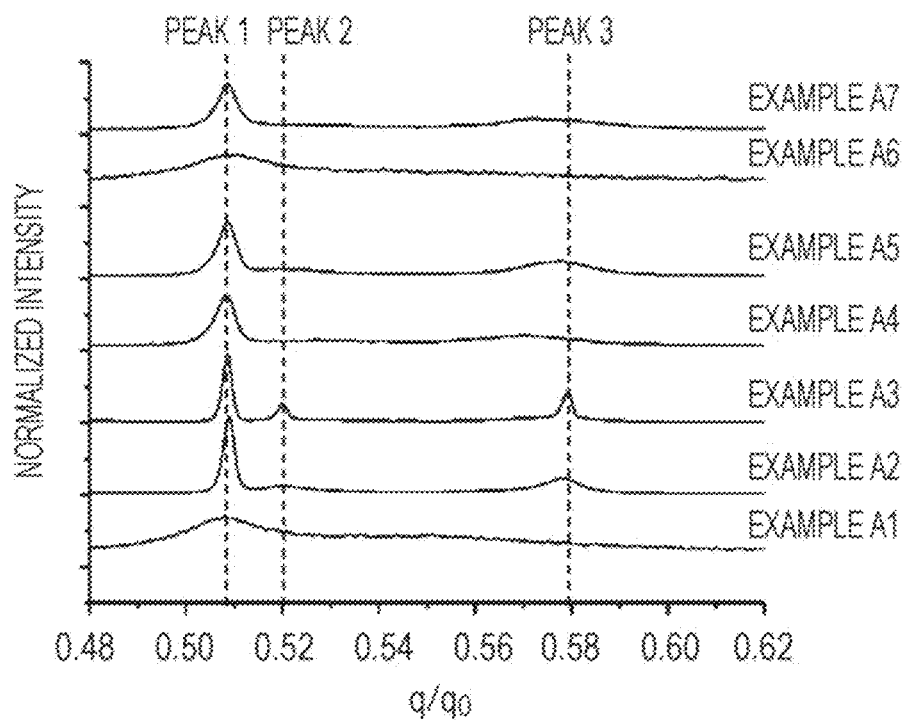
FIG. 6D is a graph illustrating XRD patterns in Examples A1 to A7.

FIG. 6D is a graph illustrating XRD patterns as close-ups of the range in FIG. 6C in which $q/q_0$=0.48 to 0.62. When the intensity of the peak at $q_0$ is defined as $I_4$, the intensity of the peak within the range in which $q/q_0$=0.503 to 0.514 as $I_1$, the position of that peak as $2θ_{p1}$, and the half-width of that peak as $Δ2θ_1$, $2θ_{p1}$=15.78°, and $Δ2θ_1$=0.36°. The pattern had no clear peak within the range in which $q/q_0$=0.511 to 0.531, but had a very broad peak stronger than the background (in the range in which 2θ =approximately 16° to 18°). When its intensity is defined as $I_2$, $I_2/I_4$=8.2%. Although the position ($2θ_{p2}$) and half-width ($Δ2θ_2$) of the peak are indeterminable, $Δ2θ_2/2θ_{p2}$>5% at a conservative estimate. The range in which $q/q_0$=0.565 to 0.585 overlapped the second peak range.

Fabrication of a Secondary Battery

The solid electrolyte material in Example A1 and $LiCoO_2$ as an active material were weighed out in a ratio by volume of 70:30 in an argon glove box. These were mixed in an agate mortar, giving a mixture.

An amount of the solid electrolyte material in Example A1 equivalent to a thickness of 700 μm, 8.5 mg of the mixture, and 16.5 mg of A1 powder were layered in this order in an insulating casing cylinder. This was subjected to compression molding at a pressure of 300 MPa, giving a first electrode and a solid electrolyte layer.

Then a layer of metallic In (200 μm thick) was placed on the side of the solid electrolyte layer opposite the side touching the first electrode. This was subjected to compression molding at a pressure of 80 MPa, giving a multilayer body formed by a first electrode, a solid electrolyte layer, and a second electrolyte.

Then a stainless-steel current collector was placed on the top and bottom of the multilayer body, and current collection lead wires were attached to the current collectors.

Lastly, the inside of the insulating casing cylinder was isolated from the external atmosphere and sealed using insulating ferrules.

In this way, a secondary battery in Example A1 was fabricated.

Charge and Discharge Test

Figure 7:
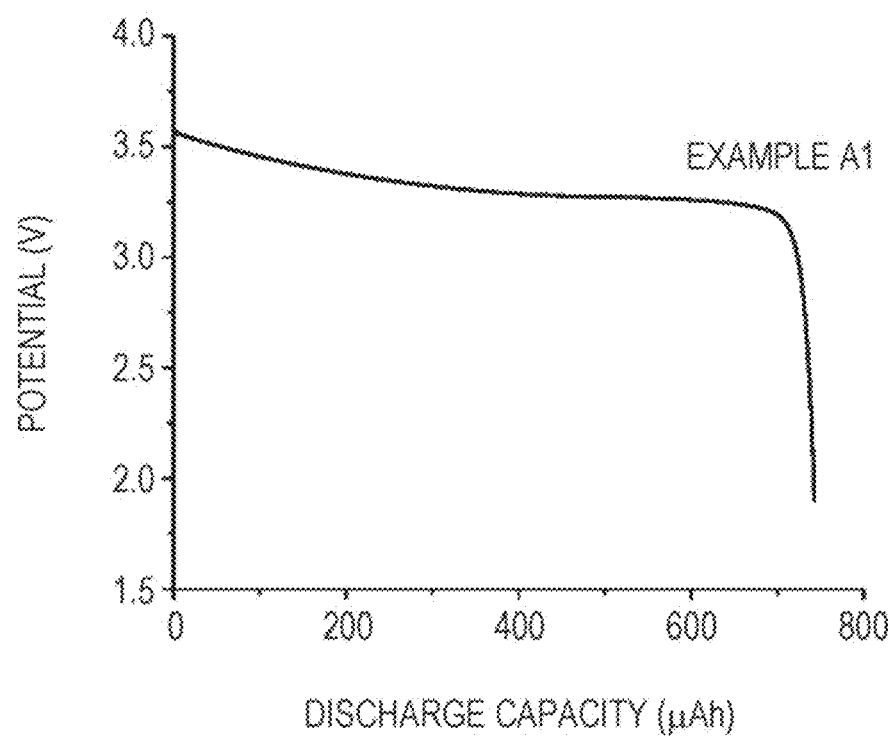
FIG. 7 is a graph illustrating initial discharge characteristics.

FIG. 7 is a graph illustrating initial discharge characteristics.

The results presented in FIG. 7 were measured by the following method.

That is, the secondary battery in Example A1 was placed in a thermostatic chamber at 25° C.

The battery was charged at a constant current that would be a C-rate of 0.05C (20-hour rate) relative to the theoretical capacity of the battery, and charging was ended at a voltage of 3.6 V.

Then the battery was discharged at the same current, which would be a C-rate of 0.05C, and discharging was ended at a voltage of 1.9 V.

From this measurement, the initial discharge capacity of the secondary battery in Example A1 was 743 µAh.

Examples A2 to A7

The following describes the synthesis and testing methods in Examples A2 to A7.

Production of a Solid Electrolyte Material

In Examples A2 to A7, raw-material powders were weighed out to a predetermined composition in a glove box the inside of which can be kept to be a dry and low-oxygen atmosphere with a dew point of −60° C. or lower and an oxygen concentration of 5 ppm or less. The composition of the solid electrolyte produced in each of Examples A2 to A7 is presented in Table 1 below. For example, if the composition was $Li_aY_bM_cCl_d$, the raw-material powders were weighed out and mixed in a ratio of $LiCl:YCl_3:MCl_m$=a:b:c, where M is a metal element, and m is the valency of M. The mixture was then milled at 600 rpm for 12 hours using a planetary ball mill. In Examples A2 to A5 and A7, the milled mixture was heated at a predetermined temperature for 5 hours. The heating temperature in each Example is presented in Table 1 below.

Analysis of the Crystal Structure

The crystal structure of the solid electrolyte material in each of Examples A2 to A7 was measured in the same way as in Example A1 above. In the measurement of the XRD diffraction diagram in Examples A2 and A3, an X-ray diffractometer (SmartLab, RIGAKU) was used, and the X-ray source was Cu-Kα radiation from which only Kαt was extracted using a Johansson monochromator.

The X-ray diffraction diagrams in Examples A2 to A7 are presented in FIGS. 6A and 6B.

As in Example A1, the horizontal axis 2θ of the X-ray diffraction diagram in FIGS. 6A and 6B was changed to $q=4\pi \sin(\theta)/\lambda$, and, when the strongest peak within the range in which q=2.109 Å$^{-1}$ to 2.315 Å$^{-1}$ is defined as $q_0$ (Peak 4 in FIG. 6A), q was normalized by $q_0$. Diffraction diagrams obtained when the normalized $q/q_0$ was taken as the horizontal axis are presented in FIGS. 6C and 6D.

The diffraction diagrams exhibited a peak within each of the ranges in which $q/q_0$ was from 0.50 to 0.515, from 1.28 to 1.30, and from 1.51 to 1.54. These peaks are indicated as Peak 1, Peak 5, and Peak 6 in FIG. 6C.

As in Example A1, the intensity of the peak at $q_0$ is defined as $I_4$, the intensity of the peak within the range in which $q/q_0$=0.503 to 0.514 (first peak range) as $I_1$, the position of that peak as $2\theta_{p1}$, the half-width of that peak as $2\Delta\theta_1$, the intensity of the peak within the range in which $q/q_0$=0.511 to 0.531 (second peak range) as $I_2$, the position of that peak as $2\theta_{p2}$, the half-width of that peak as $2\Delta\theta_2$, the intensity of the peak within the range in which $q/q_0$=0.565 to 0.585 (third peak range) as $I_3$, the position of that peak as $2\theta_{p3}$, and the half-width of that peak as $2\Delta\theta_3$. $2\theta_{p1}$, $2\theta_{p2}$, and $2\theta_{p3}$ in this setting are presented in Table 1, and $I_2/I_4$, $I_3/I_4$, $\Delta\theta_1/\theta_{p1}$, $\Delta\theta_2/\theta_{p2}$, and $\Delta\theta_3/\theta_{p3}$ in Table 2 below.

If there was no peak in the range, the inventors deemed that $I_n$=0. If a peak was very broad and extended beyond the limits of the range, the highest intensity in the range minus the background was deemed to be $I_n$.

Detailed Analysis of the Crystal Structure

The XRD diffraction pattern obtained in Example A2 was analyzed by Rietveld refinement. The analysis by Rietveld refinement was done using RIETAN-FP (see F. Izumi and K. Momma, "Three-dimensional visualization in powder diffraction," Solid State Phenom., 130, 15-20 (2007).). The model structure was an LYC system (space group Pnma, ICSD No. 50152) in which Yb was changed to Y. The LYC system was optimized by fitting for scale factors, background functions, profile-function parameters, and crystal-structure parameters. The results of fitting were unsatisfactory when the model structure was the LYC system in ICSD No. 50152. This model structure has only one type of crystallographically equivalent Y sites (named the Y1 site), and adding a Y site to the position 0.5 units away from Y1 on the z coordinate yielded relatively good fitting results. The occupancies of the Y1 and Y2 sites in this case were 83.6% and 21.4%, respectively.

Testing for Ionic Conductivity

A conductivity measurement cell in each of Examples A2 to A7 was fabricated as in Example A1 above in a glove box the inside of which can be kept to be a dry and low-oxygen atmosphere with a dew point of −90° C. or lower and an oxygen concentration of 5 ppm or less.

Except for this, the same method as in Example A1 above was followed to measure ionic conductivity.

The ionic conductivity in Examples A2 to A7 above is presented in Table 2 below.

Fabrication of a Secondary Battery

The solid electrolyte material in each of Examples A2 to A7 and LiCoO$_2$ as a positive electrode active material were weighed out in a ratio by volume of 30:70 in a glove box the inside of which can be kept to be a dry and low-oxygen atmosphere with a dew point of −90° C. or lower and an oxygen concentration of 5 ppm or less. These were mixed in an agate mortar, giving a positive electrode mixture in each of Examples A2 to A7.

Except for these, the same method as in Example A1 above was followed to fabricate a secondary battery in each of Examples A2 to A7.

Charge and Discharge Test

The secondary battery in each of Examples A2 to A7 was subjected to a charge and discharge test in the same way as in Example A1 above. The initial discharge characteristics in Examples A2 to A7 were similar to those in Example A1; good charge and discharge characteristics were achieved.

Examples B1 to B5

The following describes the synthesis and testing methods in Examples B1 to B5.

Production of a Solid Electrolyte Material

In Examples B1 to B5, raw-material powders were weighed out in a glove box the inside of which can be kept to be a dry and low-oxygen atmosphere with a dew point of −60° C. or lower and an oxygen concentration of 5 ppm or less. The composition of the solid electrolyte produced in each of Examples B1 to B5 is presented in Table 3 below.

Except for these, the same method as in Example A1 above was followed to produce a solid electrolyte material in each of Examples B1 to B5.

In Examples B1 to B5, raw-material powders were weighed out to a predetermined composition in a glove box the inside of which can be kept to be a dry and low-oxygen atmosphere with a dew point of −60° C. or lower and an oxygen concentration of 5 ppm or less. The composition of the solid electrolyte produced in each of Examples B1 to B5 is presented in Table 3 below. For example, if the composition was $Li_aY_bM_cBr_d$, the raw-material powders were weighed out and mixed in a ratio of $LiBr:YBr_3:MBr_m$=a:b:c, where M is a metal element, and m is the valency of M. For Example B5, in which the composition included multiple halogens, the raw-material powders were weighed out and mixed so that $LiCl:LiBr:LiI:YCl_3:YI_3:SmBr3$=0.651:1.700:0.650:0.450:0.450:0.100. The mixture was then milled at 600 rpm for 12 hours using a planetary ball mill. In Examples B2 to B4, the milled mixture was heated at a predetermined temperature for 5 hours. The heating temperature in each Example is presented in Table 3 below.

Analysis of the Crystal Structure

The crystal structure of the solid electrolyte material in each of Examples B1 to B5 was measured in the same way as in Example A1 above.

Figure 8A:
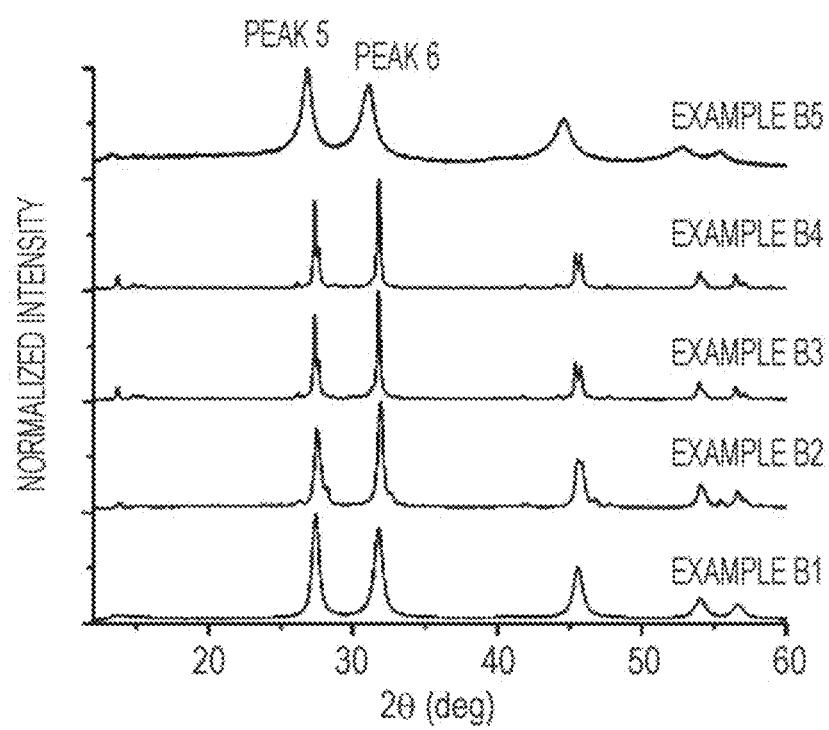
FIG. 8A is a graph illustrating XRD patterns in Examples B1 to B5.
Figure 8B:
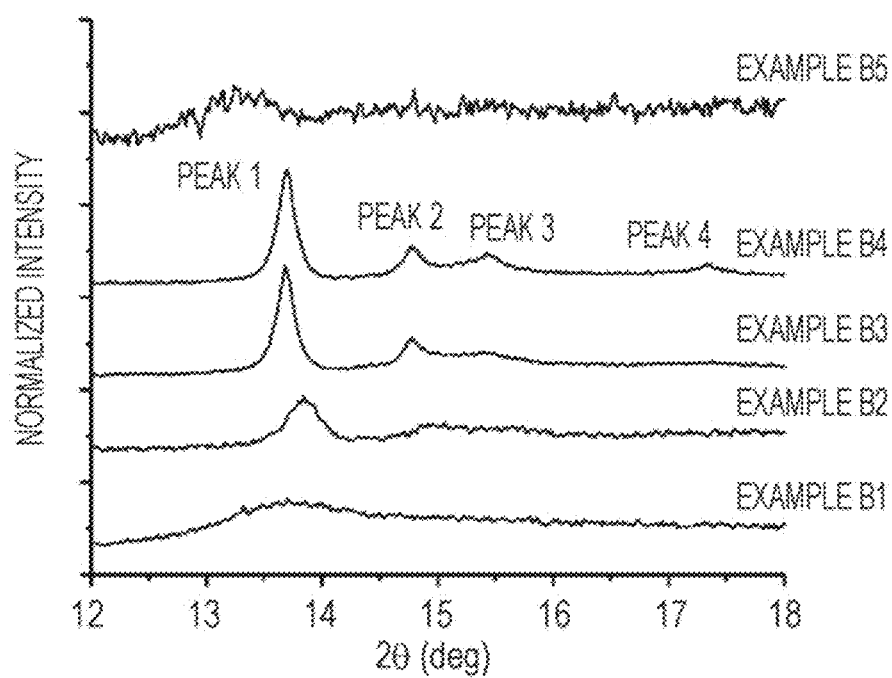
FIG. 8B is a graph illustrating XRD patterns in Examples B1 to B5.

The X-ray diffraction diagrams in Examples B1 to B5 are presented in FIGS. 8A and 8B.

Figure 8C:
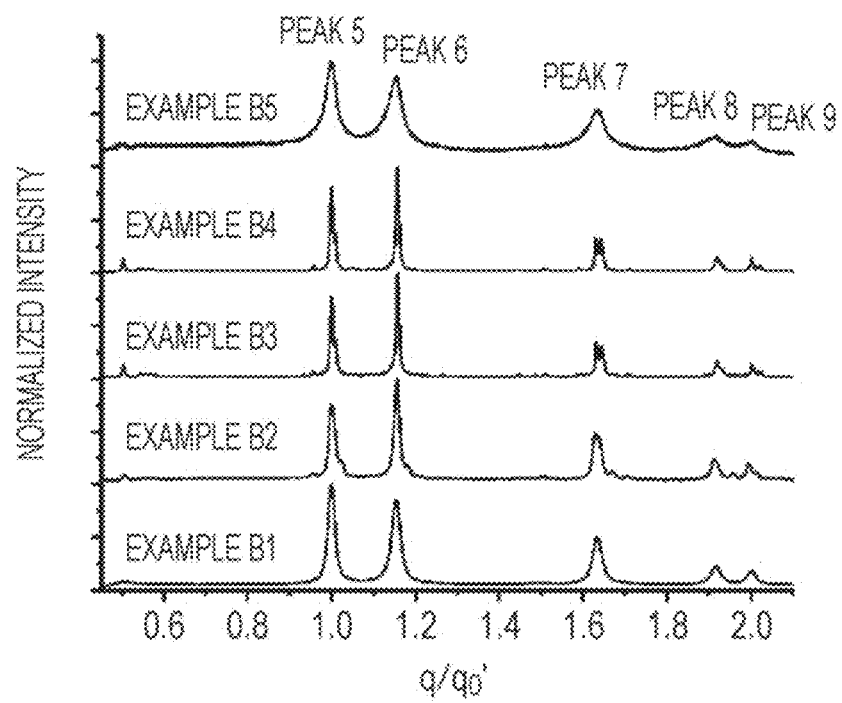
FIG. 8C is a graph illustrating XRD patterns in Examples B1 to B5.
Figure 8D:
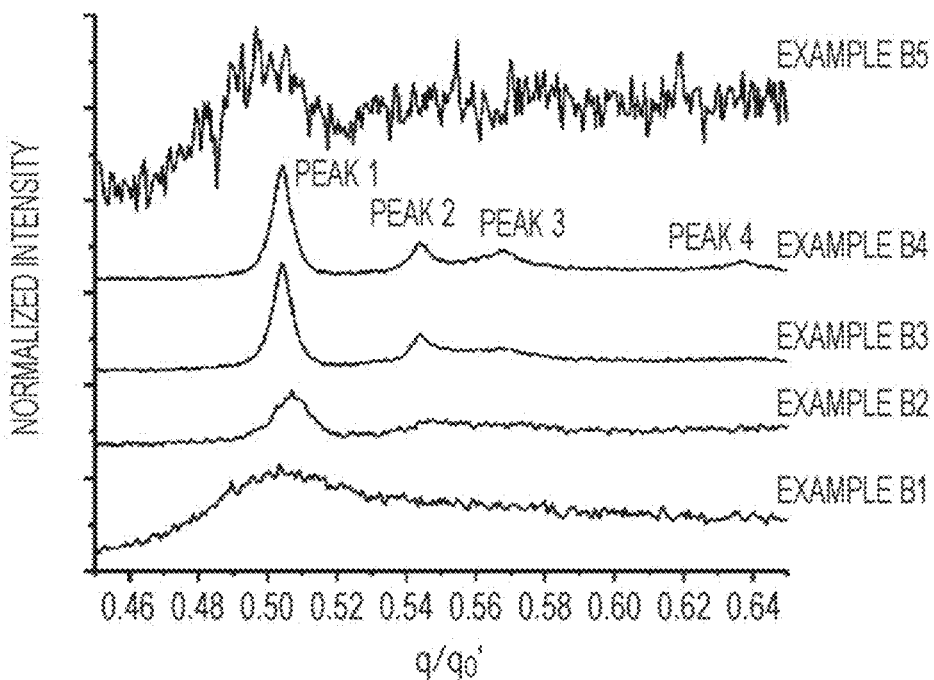
FIG. 8D is a graph illustrating XRD patterns in Examples B1 to B5.

As in Example A1, the horizontal axis 2θ of the X-ray diffraction diagram in FIGS. 8A and 8B was changed to $q=4\pi \sin(\theta)/\lambda$, and, when the q for the peak on the lower-angle side (Peak 5 in FIG. 8A) of the two strong peaks present within the range in which $q=1.76$ Å$^{-1}$ to 2.18 Å$^{-1}$ (Peaks 5 and 6 in FIG. 8A) is defined as $q_0'$, q was normalized by $q_0'$. Diffraction diagrams obtained when the normalized $q/q_0'$ was taken as the horizontal axis are presented in FIGS. 8C and 8D.

The diffraction diagrams exhibited a peak within each of the ranges in which $q/q_0'$ was from 0.49 to 0.66, from 1.14 to 1.17, from 1.625 to 1.645, from 1.88 to 1.94, and from 1.90 to 2.10. These peaks are indicated as Peak 1, Peak 6, Peak 7, Peak 8, and Peak 9 in FIGS. 8C and 8D.

The intensity of the peak at $q_0'$ is defined as $I_5$, the intensity of the peak within the range in which $q/q_0'$=0.494 to 0.511 (first peak range) as $I_1$, the position of that peak as $2\theta_{p1}$, the half-width of that peak as $2\Delta\theta_1$, the intensity of the peak within the range in which $q/q_0'$=0.538 to 0.550 (second peak range) as $I_2$, the position of that peak as $2\theta_{p2}$, the half-width of that peak as $2\Delta\theta_2$, the intensity of the peak within the range in which $q/q_0'$=0.559 to 0.575 (third peak range) as $I_3$, the position of that peak as $2\theta_{p3}$, the half-width of that peak as $2\Delta\theta_3$, the intensity of the peak within the range in which $q/q_0'$=0.632 to 0.644 (fourth peak range) as $I_4$, the position of that peak as $2\theta_{p4}$, and the half-width of that peak as $2\Delta\theta_4$. $2\theta_{p1}$, $2\theta_{p2}$, $2\theta_{p3}$, and $2\theta_{p4}$ in this setting are presented in Table 3, $I_1/I_5$, $I_2/I_5$, $I_3/I_5$, $I_4/I_5$, $I_1/I_6$, $I_2/I_6$, $I_3/I_6$, and $I_4/I_6$ in Table 4 below, and $\Delta\theta_1/\theta_{p1}$, $\Delta\theta_2/\theta_{p2}$, $\Delta\theta_3/\theta_{p3}$, and $\Delta\theta_4/\theta_{p4}$ in Table 5 below.

If there was no peak in the range, the inventors deemed that $I_n$=0. If a peak was very broad and extended beyond the limits of the range, the highest intensity in the range minus the background was deemed to be $I_n$.

Detailed Analysis of the Crystal Structure

The XRD diffraction pattern obtained in Example B3 was analyzed by Rietveld refinement. The analysis by Rietveld refinement was done using RIETAN-FP. The model structure was an LEB system (space group C2/m, ICSD No. 50182) in which Er was changed to Y. The LEB system was optimized by fitting for scale factors, background functions, profile-function parameters, and crystal-structure parameters. The results of fitting were unsatisfactory when the model structure was the LEB system in ICSD No. 50182. This model structure has only one type of crystallographically equivalent Y sites (named the Y1 site), and setting a Y site in the same position as the $Li_2$ position (named the Y2 site) and optimizing parameters improved the results of fitting. The occupancies of the Y1 and Y2 sites in this case were 90.2% and 19.8%, respectively.

Testing for Ionic Conductivity

A conductivity measurement cell in each of Examples B1 to B5 was fabricated as in Example A1 above in a glove box the inside of which can be kept to be a dry and low-oxygen atmosphere with a dew point of −90° C. or lower and an oxygen concentration of 5 ppm or less.

Except for this, the same method as in Example A1 above was followed to measure ionic conductivity.

The ionic conductivity in Examples B1 to B5 above is presented in Table 4 below.

Fabrication of a Secondary Battery

The solid electrolyte material in each of Examples B1 to B5 and $LiCoO_2$ as a positive electrode active material were weighed out in a ratio by volume of 30:70 in a glove box the inside of which can be kept to be a dry and low-oxygen atmosphere with a dew point of −90° C. or lower and an oxygen concentration of 5 ppm or less. These were mixed in an agate mortar, giving a positive electrode mixture in each of Examples B1 to B5.

Except for these, the same method as in Example A1 above was followed to fabricate a secondary battery in each of Examples B1 to B5.

Charge and Discharge Test

The secondary battery in each of Examples B1 to B5 was subjected to a charge and discharge test in the same way as in Example A1 above. The initial discharge characteristics in Examples B1 to B5 were similar to those in Example A1; good charge and discharge characteristics were achieved.

Comparative Example 1

The raw-material powders for the solid electrolyte were LiCl and $FeCl_2$, and these were mixed in a molar ratio of $LiCl:FeCl_2$=2:1. This gave $Li_2FeCl_4$, a solid electrolyte material in Comparative Example 1.

Except for this, the same method as in Example A1 above was followed to perform testing for ionic conductivity.

The measured ionic conductivity was $8.7 \times 10^{-6}$ S/cm.

The solid electrolyte used in the mixture and the solid electrolyte layer was the solid electrolyte material in Comparative Example 1.

Except for this, the same method as in Example A1 above was followed to fabricate a secondary battery and perform a charge and discharge test.

The initial discharge capacity of the secondary battery in Comparative Example 1 was less than 1 μAh. That is, the secondary battery in Comparative Example 1 did not charge and discharge.

The configurations and test results in Examples A1 to A7, B1 to B5, and Comparative Example 1 above are presented in Tables 1 to 5.

TABLE 1

|  | Composition | Synthetic method | $2\theta_{p1}$ | $2\theta_{p2}$ | $2\theta_{p3}$ |
|---|---|---|---|---|---|
| Example A1 | $Li_3YCl_6$ | BM | 15.78 | 16.3-17.2 | N/A |
| Example A2 | $Li_{2.85}Y_{1.05}Cl_6$ | 300° C. annealing | 15.79 | 16.12 | 17.94 |
| Example A3 | $Li_{2.85}Y_{1.05}Cl_6$ | 500° C. annealing | 15.78 | 16.14 | 17.99 |
| Example A4 | $Li_3YCl_6$ | 400° C. annealing | 15.77 | 16.31 | 17.74 |
| Example A5 | $Li_{2.7}Y_{1.1}Cl_6$ | 400° C. annealing | 15.76 | 16.13 | 17.89 |
| Example A6 | $Li_{2.8}YCa_{0.1}Cl_6$ | BM | 15.76 | 16.2-17.2 | N/A |
| Example A7 | $Li_{2.8}YCa_{0.1}Cl_6$ | 300° C. annealing | 15.75 | 16.05 | 17.83 |
| Reference Example A1 | $Li_3YCl_6$ | Simulated |  |  |  |
| Comparative Example 1 | $Li_2FeCl_4$ | BM |  |  |  |

TABLE 2

|  | Composition | Synthetic method | σ (S/cm) | $I_2/I_4$ | $I_3/I_4$ | $\Delta\theta_1/\theta_{p1}$ | $\Delta\theta_2/\theta_{p2}$ | $\Delta\theta_3/\theta_{p3}$ |
|---|---|---|---|---|---|---|---|---|
| Example A1 | $Li_3YCl_6$ | BM | 6.0E-04 | 8.20% |  | 2.28% |  | N/A |
| Example A2 | $Li_{2.85}Y_{1.05}Cl_6$ | 300° C. annealing | 2.2E-04 | 3.98% | 9.46% | 0.55% | 0.55% | 6.05% |
| Example A3 | $Li_{2.85}Y_{1.05}Cl_6$ | 500° C. annealing | 2.8E-04 | 12.33% | 20.41% | 0.48% | 0.48% | 0.63% |
| Example A4 | $Li_3YCl_6$ | 400° C. annealing | 8.0E-04 | 3.57% | 6.73% | 1.01% | 1.01% | 8.55% |
| Example A5 | $Li_{2.7}Y_{1.1}Cl_6$ | 400° C. annealing | 2.4E-04 | 4.22% | 9.66% | 0.91% | 0.91% | 5.12% |
| Example A6 | $Li_{2.8}YCa_{0.1}Cl_6$ | BM | 5.2E-04 | 6.95% |  | 3.16% |  | N/A |
| Example A7 | $Li_{2.8}YCa_{0.1}Cl_6$ | 300° C. annealing | 3.0E-04 | 3.99% | 7.23% | 1.00% | 1.00% | 7.66% |
| Reference Example A1 | $Li_3YCl_6$ | Simulated |  | 34.47% | 50.70% |  |  |  |
| Comparative Example 1 | $Li_2FeCl_4$ | BM | 8.7e-6 |  |  |  |  |  |

TABLE 3

|  | Composition | Synthetic method | $2\theta_1$ | $2\theta_2$ | $2\theta_3$ | $2\theta_4$ |
|---|---|---|---|---|---|---|
| Example B1 | $Li_3YBr_6$ | BM | 13.82 | — | — | — |
| Example B2 | $Li_3YBr_6$ | Annealing at 300° C. | 13.84 | — | — | — |
| Example B3 | $Li_{2.7}Y_{1.1}Br_6$ | Annealing at 300° C. | 13.68 | 14.78 | 15.42 | 17.38 |
| Example B4 | $Li_{2.7}Y_{1.1}Br_6$ | Annealing at 400° C. | 13.69 | 14.80 | 15.42 | 17.35 |
| Example B5 | $Li_3Y_{0.9}Sm_{0.1}Cl_2Br_2I_2$ | BM | 13.28 | — | — | — |
| Reference Example B1 | $Li_3YBr_6$ | Simulated |  |  |  |  |
| Comparative Example 1 | $Li_2FeCl_4$ | BM |  |  |  |  |

TABLE 4

|  | Composition | Synthetic method | σ (S/cm) | $I_1/I_6$ | $I_2/I_6$ | $I_3/I_6$ | $I_4/I_6$ | $I_1/I_5$ | $I_2/I_5$ | $I_3/I_5$ | $I_4/I_5$ |
|---|---|---|---|---|---|---|---|---|---|---|---|
| Example B1 | $Li_3YBr_6$ | BM | 8.4e-4 | 3.8% | <1% | <1% | <1% | 3.3% | <1% | <1% | <1% |
| Example B2 | $Li_3YBr_6$ | Annealing at 300° C. | 9.3e-4 | 3.3% | <1% | <1% | <1% | 4.4% | <1% | <1% | <1% |
| Example B3 | $Li_{2.7}Y_{1.1}Br_6$ | Annealing at 300° C. | 6.9e-4 | 11.1% | 2.7% | 1.4% | <1% | 14.0% | 3.5% | 1.8% | <1% |
| Example B4 | $Li_{2.7}Y_{1.1}Br_6$ | Annealing at 400° C. | 8.8e-4 | 11.8% | 3.6% | 3.1% | 1.6% | 14.6% | 4.5% | 3.8% | 2.0% |
| Example B5 | $Li_3Y_{0.9}Sm_{0.1}Cl_2Br_2I_2$ | BM | 3.0e-3 | 4.1% | <1% | <1% | <1% | 5.0% | <1% | <1% | <1% |
| Reference Example B1 | $Li_3YBr_6$ | Simulated |  | 17.2% | 7.2% | 14.8% | 8.8% | 28.8% | 12.0% | 24.8% | 14.8% |
| Comparative Example 1 | $Li_2F_eCl_4$ | BM | 8.7e-6 |  |  |  |  |  |  |  |  |

TABLE 5

| | Composition | Synthetic method | $\Delta\theta_1/\theta_{p1}$ | $\Delta\theta_2/\theta_{p2}$ | $\Delta\theta_3/\theta_{p3}$ | $\Delta\theta_4/\theta_{p4}$ |
|---|---|---|---|---|---|---|
| Example B1 | $Li_3YBr_6$ | BM | 7.13% | N/A | N/A | N/A |
| Example B2 | $Li_3YBr_6$ | Annealing at 300° C. | 0.14% | N/A | N/A | N/A |
| Example B3 | $Li_{2.7}Y_{1.1}Br_6$ | Annealing at 300° C. | 1.38% | 1.24% | 5.11% | N/A |
| Example B4 | $Li_{2.7}Y_{1.1}Br_6$ | Annealing at 400° C. | 1.48% | 1.59% | 2.29% | 2.04% |
| Example B5 | $Li_3Y_{0.9}Sm_{0.1}Cl_2Br_2I_2$ | BM | 5.26% | N/A | N/A | N/A |

DISCUSSION

As can be seen, Examples A1 to A7 and B1 to B5, compared with Comparative Example 1, exhibit a high ionic conductivity of not less than $1\times10^{-4}$ S/cm near room temperature. Furthermore, in all Examples, the temperature and duration of heating required for synthesis were 500° C. or lower and 5 hours, or no heating was required.

In Examples A1 to A7, the diffraction diagram exhibited a peak within each of the ranges in which $q/q_0$ was from 0.50 to 0.515, from 1.28 to 1.30, and from 1.51 to 1.54, indicating the structure was one in which halogen ions were in an arrangement similar to hexagonal closest packing as in the LYC system.

$I_2/I_4$ and $I_3/I_4$ were small, not more than 20% and not more than 30%, respectively. This indicates that the structure, compared with the LYC system, is one in which Y is not present only in one site but is dispersed across two or more different equivalent sites. The analysis by Rietveld refinement in Example A2 also yielded consistent results.

In Examples A1 to A7, furthermore, any or more than one of the following relationships was satisfied: $\Delta\theta_1/\theta_{p1}>0.5\%$, $\Delta\theta_2/\theta_{p2}>0.5\%$, and $\Delta\theta_3/\theta_{p3}>0.5\%$; the structure was one that was greatly disordered in terms of the positions of atoms in the crystal, in particular, the periodicity of Y positions.

In Examples B1 to B5, the diffraction diagram exhibited a peak within each of the ranges in which $q/q_0'$ was from 0.49 to 0.66, from 1.14 to 1.17, from 1.625 to 1.645, from 1.88 to 1.94, and from 1.90 to 2.10, indicating the structure was one in which halogen ions were in an arrangement similar to cubic closest packing as in the LEB system.

Furthermore, any or more than one of the following conditions was satisfied: $I_1/I_5\leq20\%$, $I_2/I_5\leq10\%$, $I_3/I_5\leq20\%$, $I_4/I_5\leq10\%$, $I_1/I_6\leq15\%$, $I_2/I_6\leq5\%$, $I_3/I_6\leq10\%$, and $I_4/I_6\leq5\%$.

This indicates that the structure, compared with the LEB system, is one in which Y is not present only in one site but is dispersed across two or more different equivalent sites. The analysis by Rietveld refinement in Example B3 also yielded consistent results.

In Examples B1 to B5, furthermore, any or more than one of the following relationships was satisfied: $\Delta\theta_1/\theta_{p1}>1\%$, $\Delta\theta_2/\theta_{p2}>1\%$, $\Delta\theta_3/\theta_{p3}>1\%$, and $\Delta\theta_4/\theta_{p4}>1\%$; the structure was one that was greatly disordered in terms of the positions of atoms in the crystal, in particular, the periodicity of Y positions. It should be noted that if no peak is observed at $\theta_{p1}$ to $\theta_{p4}$, it means the peak is so broad that its width cannot be determined. In such a case, therefore, the relationship is virtually satisfied.

Additionally, in Examples A1 to A7 and B1 to B5, the battery was found to be capable of charging and discharging at room temperature throughout. In Comparative Example 1, by contrast, the discharge capacity was almost nil, so that the battery did not operate. The materials in Examples A1 to A7 and B1 to B5, furthermore, produce no hydrogen sulfide because their constitutive elements do not include sulfur.

Overall, solid electrolyte materials according to the present disclosure are electrolyte materials that produce no hydrogen sulfide and, at the same time, are capable of good charging and discharging by virtue of being highly conductive to lithium ions.

What is claimed is:

1. A solid electrolyte material comprising:
   Li, M, and X, wherein:
   M contains Y and further contains at least one selected from the group consisting of Mg, Ca, Sr, Ba, Zn, Zr, Nb, Ta, and Sm;
   X is at least one selected from the group consisting of Cl, Br, and I;
   a first converted pattern includes a base peak within a range in which q is 2.109 Å$^{-1}$ or more and 2.315 Å$^{-1}$ or less, wherein the first converted pattern is obtained by converting an X-ray diffraction pattern of the solid electrolyte material to change a horizontal axis of the X-ray diffraction pattern from a diffraction angle 2θ to q, where q=4π sin θ/λ, where λ is a wavelength of X-rays
   a second converted pattern includes a peak within each of a range in which $q/q_0$ is 1.28 or more and 1.30 or less and a range in which $q/q_0$ is 1.51 or more and 1.54 or less, wherein the second converted pattern is obtained by converting the X-ray diffraction pattern to change the horizontal axis of the X-ray diffraction pattern from the diffraction angle 2θ to $q/q_0$, where $q_0$ is a value of q corresponding to the base peak in the first converted pattern; and
   the solid electrolyte material satisfies at least one selected from the group consisting of the following: $I_2/I_4\leq20\%$ and $I_3/I_4\leq30\%$,
   where $I_2$ is an intensity of a second peak, which is a strongest peak within a second range of the second converted pattern, in the second range $q/q_0$ being 0.511 or more and 0.531 or less,
   $I_3$ is an intensity of a third peak, which is a strongest peak within a third range of the second converted pattern, in the third range $q/q_0$ being 0.565 or more and 0.585 or less, and
   $I_4$ is an intensity of a peak in the second converted pattern at a point at which $q/q_0$ is 1.

2. The solid electrolyte material according to claim 1, wherein
   the solid electrolyte material satisfies at least one selected from the group consisting of the following: $\Delta\theta_1/\theta_{p1}>0.5\%$, $\Delta\theta_2/\theta_{p2}>0.5\%$, and $\Delta\theta_3/\theta_{p3}>0.5\%$,
   where $2\theta_{p1}$ is a diffraction angle at which a first peak, which is a strongest peak within a first range of the second converted pattern, in the first range $q/q_0$ being 0.503 or more and 0.514 or less, has an apex,
   $\Delta 2\theta_1$ is a half-width of the first peak,
   $2\theta_{p2}$ is a diffraction angle at which the second peak has an apex,
   $\Delta 2\theta_2$ is a half-width of the second peak,
   $2\theta_{p3}$ is a diffraction angle at which the third peak has an apex, and
   $\Delta 2\theta_3$ is a half-width of the third peak.

3. The solid electrolyte material according to claim 1, wherein
X contains Cl.

4. The solid electrolyte material according to claim 1, wherein:
the solid electrolyte material has a crystal structure of a $Li_3YbCl_6$ system, which belongs to a space group Pnma;
M occupies equivalent positions in the crystal structure; and
an M occupancy of each of the equivalent positions is 10% or more.

5. A battery comprising:
a positive electrode;
a negative electrode; and
an electrolyte layer between the positive electrode and the negative electrode, wherein
at least one selected from the group consisting of the positive electrode, the negative electrode, and the electrolyte layer contains a solid electrolyte material according to claim 1.

6. A solid electrolyte material comprising:
Li, M, and X, wherein:
M contains Y and further contains at least one selected from the group consisting of Mg, Ca, Sr, Ba, Zn, Zr, Nb, Ta, and Sm;
X is at least one selected from the group consisting of Cl, Br, and I;
a first converted pattern includes a base peak within a range in which q is 2.109 Å$^{-1}$ or more and 2.315 Å$^{-1}$ or less, wherein the first converted pattern is obtained by converting an X-ray diffraction pattern of the solid electrolyte material to change a horizontal axis of the X-ray diffraction pattern from a diffraction angle 2θ to q, where q=4π sin θ/λ, where λ is a wavelength of X-rays;
a second converted pattern includes a peak within each of a range in which $q/q_0$ is 1.28 or more and 1.30 or less and a range in which $q/q_0$ is 1.51 or more and 1.54 or less, wherein the second converted pattern is obtained by converting the X-ray diffraction pattern to change the horizontal axis of the X-ray diffraction pattern from the diffraction angle 2θ to $q/q_0$, where $q_0$ is a value of q corresponding to the base peak in the first converted pattern; and
the solid electrolyte material satisfies at least one selected from the group consisting of the following: $I_2/I_1 \leq 100\%$ and $I_2/I_4 \leq 30\%$,
where $I_1$ is an intensity of a first peak, which is a strongest peak within a first range of the second converted pattern, in the first range $q/q_0$ being 0.503 or more and 0.514 or less,
$I_2$ is an intensity of a second peak, which is a strongest peak within a second range of the second converted pattern, in the second range $q/q_0$ being 0.550 or more and 0.565 or less, and
$I_4$ is an intensity of a peak in the second converted pattern at a point at which $q/q_0$ is 1.

7. The solid electrolyte material according to claim 6, wherein
X contains Cl.

8. The solid electrolyte material according to claim 6, wherein:
the solid electrolyte material has a crystal structure of a $Li_3ErCl_6$ system, which belongs to a space group P-3m1;
M occupies three or more equivalent positions in the crystal structure; and
an M occupancy of each of the three or more equivalent positions is 10% or more.

9. A battery comprising:
a positive electrode;
a negative electrode; and
an electrolyte layer between the positive electrode and the negative electrode, wherein
at least one selected from the group consisting of the positive electrode, the negative electrode, and the electrolyte layer contains a solid electrolyte material according to claim 6.

10. A solid electrolyte material comprising:
Li, M, and X, wherein:
M contains Y and further contains at least one selected from the group consisting of Mg, Ca, Sr, Ba, Zn, Zr, Nb, Ta, and Sm;
X is at least one selected from the group consisting of Cl, Br, and I;
a first converted pattern includes a base peak within a range in which q is 1.76 Å$^{-1}$ or more and 2.18 Å$^{-1}$ or less, wherein the first converted pattern is obtained by converting an X-ray diffraction pattern of the solid electrolyte material to change a horizontal axis of the X-ray diffraction pattern from a diffraction angle 2θ to q, where q=4π sin θ/λ, where λ is a wavelength of X-rays, and, of the two peaks, the peak at a smaller q is a base peak;
a second converted pattern includes a peak within each of a range in which $q/q_0'$ is 1.14 or more and 1.17 or less and a range in which $q/q_0'$ is 1.625 or more and 1.645 or less, wherein the second converted pattern is obtained by converting the X-ray diffraction pattern to change the horizontal axis of the X-ray diffraction pattern from the diffraction angle 2θ to $q/q_0'$, where $q_0'$ is a q corresponding to the base peak in the first converted pattern; and
the solid electrolyte material satisfies at least one selected from the group consisting of the following: $I_1/I_6 \leq 15\%$, $I_2/I_6 \leq 5\%$, $I_3/I_6 \leq 10\%$, and $I_4/I_6 \leq 5\%$,
where $I_1$ is an intensity of a first peak, which is a strongest peak within a first range of the second converted pattern, in the first range $q/q_0'$ being 0.494 or more and 0.511 or less,
$I_2$ is an intensity of a second peak, which is a strongest peak within a second range of the second converted pattern, in the second range $q/q_0'$ being 0.538 or more and 0.550 or less,
$I_3$ is an intensity of a third peak, which is a strongest peak within a third range of the second converted pattern, in the third range $q/q_0'$ being 0.559 or more and 0.575 or less,
$I_4$ is an intensity of a fourth peak, which is a strongest peak within a fourth range of the second converted pattern, in thr fourth range $q/q_0'$ being 0.632 or more and 0.644 or less, and
$I_6$ is an intensity of a sixth peak, which is a strongest peak within a sixth range of the second converted pattern, in the sixth range $q/q_0'$ being 1.140 or more and 1.170 or less.

11. The solid electrolyte material according to claim 10, wherein
the solid electrolyte material satisfies at least one selected from the group consisting of the following: $I_1/I_5 \leq 20\%$, $I_2/I_5 \leq 10\%$, $I_3/I_5 \leq 20\%$, and $I_4/I_5 \leq 10\%$,
where $I_5$ is an intensity of a peak in the second converted pattern at a point at which $q/q_0'$ is 1.

12. The solid electrolyte material claim 10, wherein
the solid electrolyte material satisfies at least one selected from the group consisting of the following: $\Delta\theta_1/\theta_{p1} > 1\%$, $\Delta\theta_2/\theta_{p2} > 1\%$, $\Delta\theta_3/\theta_{p3} > 1\%$, and $\Delta\theta_4/\theta_{p4} > 1\%$, where $2\theta_{p1}$ is a diffraction angle at which a first peak has an apex, $\Delta 2\theta_1$ is a half-width of the first peak, $2\theta_{p2}$ is a diffraction angle at which the second peak has an apex, $\Delta 2\theta_2$ is a half-width of the second peak, $2\theta_{p3}$ is a diffraction angle at which the third peak has an apex, $\Delta 2\theta_3$ is a half-width of the third peak $2\theta_{p4}$ is a diffraction angle at which the fourth peak has an apex, and $\Delta 2\theta_4$ is a half-width of the fourth peak.

13. The solid electrolyte material according to claim 10, wherein

X contains Br.

14. The solid electrolyte material according to claim 10, wherein:

the solid electrolyte material has a crystal structure of a $Li_3ErBr_6$ system, which belongs to a space group C2/m;

M occupies equivalent positions in the crystal structure; and an M occupancy of each of the equivalent positions is 10% or more.

15. A battery comprising:

a positive electrode;

a negative electrode; and an electrolyte layer between the positive electrode and the negative electrode, wherein at least one selected from the group consisting of the positive electrode, the negative electrode, and the electrolyte layer contains a solid electrolyte material according to claim 10.

* * * * *